US005668429A

United States Patent [19]
Boyd, Jr. et al.

[11] Patent Number: 5,668,429
[45] Date of Patent: Sep. 16, 1997

[54] DYNAMOELECTRIC MACHINE AND METHOD FOR MANUFACTURING SAME

[75] Inventors: John H. Boyd, Jr., Holland, Mich.; Daniel M. Saban, Fort Wayne, Ind.

[73] Assignee: General Electric Company, Fort Wayne, Ind.

[21] Appl. No.: 484,496

[22] Filed: Jun. 7, 1995

Related U.S. Application Data

[63] Continuation of Ser. No. 139,578, Oct. 20, 1993.

[51] Int. Cl.⁶ .................................................. H02K 1/12
[52] U.S. Cl. ........................ 310/254; 310/179; 310/184
[58] Field of Search .................................. 310/254, 179, 310/184; 29/596

[56] References Cited

U.S. PATENT DOCUMENTS

| | | | |
|---|---|---|---|
| 653,906 | 7/1900 | Brown | 310/211 |
| 890,776 | 6/1908 | LeBlanc | 310/211 |
| 1,034,069 | 7/1912 | Brown | 310/211 |
| 1,841,122 | 1/1932 | Hoseason | 310/236 |
| 2,922,000 | 1/1960 | Larsh | 200/80 |
| 3,027,474 | 3/1962 | Rosenberry, Jr. | 310/211 |
| 3,147,050 | 9/1964 | Wulfert et al. | 308/236 |
| 3,156,840 | 11/1964 | Clothier et al. | 310/259 |
| 3,200,275 | 8/1965 | Lindgren | 310/90 |
| 3,243,554 | 3/1966 | Malone | 200/122 |
| 3,343,013 | 9/1967 | Wightman et al. | 310/42 |
| 3,418,504 | 12/1968 | Paule et al. | 310/50 |
| 3,671,790 | 6/1972 | Widstrand | 310/216 |
| 3,778,652 | 12/1973 | Endress | 310/211 |
| 3,783,318 | 1/1974 | Widstrand | 310/216 |
| 3,916,231 | 10/1975 | Cathey | 310/62 |
| 4,031,419 | 6/1977 | Spiesberger et al. | 310/49 R |

(List continued on next page.)

FOREIGN PATENT DOCUMENTS

| | | | |
|---|---|---|---|
| 883524 | 7/1943 | France | H02K 17/16 |
| 950481 | 10/1956 | Germany | H02K 17/16 |
| 2208010 | 8/1973 | Germany | H02K 41/02 |
| 221043 | 4/1985 | Germany | H02K 21/14 |
| 52-17045 | 4/1977 | Japan | H02K 17/16 |
| 56-112844 | 9/1981 | Japan | H02K 5/15 |
| 57-49357 | 3/1982 | Japan | H02K 17/16 |
| 64-81647 | 3/1989 | Japan | H02K 17/16 |
| 344377 | 12/1989 | Japan | H02K 17/16 |
| 2-97253 | 4/1990 | Japan | H02K 11/00 |
| 3-285543 | 12/1991 | Japan | H02K 17/16 |
| 3-285542 | 12/1991 | Japan | H02K 17/16 |
| 4-165945 | 6/1992 | Japan | H02K 17/16 |
| 796998 | 1/1981 | U.S.S.R. | H02K 17/02 |
| 957357 | 9/1982 | U.S.S.R. | H02K 1/06 |
| 1203652 | 1/1986 | U.S.S.R. | H02K 17/16 |
| 1211835 | 2/1986 | U.S.S.R. | H02K 17/16 |
| 905212 | 10/1960 | United Kingdom . | |
| 1003963 | 4/1963 | United Kingdom . | |
| 986789 | 1/1964 | United Kingdom . | |
| 1440887 | 6/1976 | United Kingdom | 310/89 |

*Primary Examiner*—Steven L. Stephan
*Assistant Examiner*—Elvin G. Enad
*Attorney, Agent, or Firm*—Ralph E. Krisher, Jr.

[57] ABSTRACT

A dynamoelectric machine constructed for speed and accuracy of manufacturing has a stator core constructed of 90° symmetrical stator laminations and the windings have differing numbers of poles which overlap in slots of the stator core are wound of the core formed by the laminations in unique fashion. The rotor bars of the machine are skewed to optimize performance of the machine when in the form of a single phase induction motor. Magnet wire leads of the windings are connected directly to terminals on a plug and terminal assembly which is formed for positive location on an end frame of the machine without welding or other fastening to the end frame. The end frames of the machine and stator laminations forming the stator core are formed so as to increase the precision of the final position of the stator relative to the rotor assembly of the dynamoelectric machine. The end frames are constructed for grounding without the use of fasteners or wire. The engagement of the end frames with the stator core is employed as the basis for alignment of the machine components.

23 Claims, 10 Drawing Sheets

U.S. PATENT DOCUMENTS

| | | | |
|---|---|---|---|
| 4,031,610 | 6/1977 | Singh et al. | 29/598 |
| 4,054,767 | 10/1977 | Anderson et al. | 310/71 |
| 4,100,444 | 7/1978 | Boyd, Jr. | 310/84 |
| 4,110,644 | 8/1978 | Roddy | 310/91 |
| 4,127,785 | 11/1978 | Noguchi | 310/89 |
| 4,224,591 | 9/1980 | Senor | 337/102 |
| 4,268,772 | 5/1981 | Workman | 310/197 |
| 4,294,004 | 10/1981 | Frank | 29/622 |
| 4,296,344 | 10/1981 | Rabe | 310/184 |
| 4,399,423 | 8/1983 | Nield | 337/102 |
| 4,409,506 | 10/1983 | Ito et al. | 310/166 |
| 4,421,274 | 12/1983 | Brammerlo | 310/259 |
| 4,430,590 | 2/1984 | Davis | 310/67 R |
| 4,476,422 | 10/1984 | Kirshbaum | 318/776 |
| 4,521,953 | 6/1985 | King et al. | 29/596 |
| 4,544,856 | 10/1985 | King | 310/71 |
| 4,566,179 | 1/1986 | Sawyer et al. | 29/596 |
| 4,594,773 | 6/1986 | Frank et al. | 29/4 |
| 4,603,273 | 7/1986 | McDonald | 310/89 |
| 4,623,810 | 11/1986 | Smith | 310/90 |
| 4,635,349 | 1/1987 | Rabe | 29/596 |
| 4,649,304 | 3/1987 | Atherton et al. | 310/71 |
| 4,656,378 | 4/1987 | Atherton et al. | 310/71 |
| 4,658,167 | 4/1987 | Popov et al. | 310/156 |
| 4,673,837 | 6/1987 | Gingerich et al. | 310/239 |
| 4,675,989 | 6/1987 | Galloway et al. | 29/622 |
| 4,710,037 | 12/1987 | Newberg | 384/537 |
| 4,716,327 | 12/1987 | Stone | 310/90 |
| 4,752,707 | 6/1988 | Morrill | 310/184 |
| 4,800,309 | 1/1989 | Lakin | 310/90 |
| 4,801,831 | 1/1989 | Lewis | 310/91 |
| 4,845,396 | 7/1989 | Huber | 310/239 |
| 4,848,938 | 7/1989 | Haas et al. | 384/537 |
| 4,851,725 | 7/1989 | Keck | 310/71 |
| 4,860,436 | 8/1989 | Hirabayashi et al. | 29/622 |
| 4,906,882 | 3/1990 | Erndt et al. | 310/156 |
| 4,927,988 | 5/1990 | Nolte | 200/80 |
| 4,933,582 | 6/1990 | Hata et al. | 310/154 |
| 4,978,819 | 12/1990 | Crow et al. | 200/80 |
| 5,008,572 | 4/1991 | Marshall et al. | 310/45 |
| 5,010,266 | 4/1991 | Uchida | 310/156 |
| 5,034,640 | 7/1991 | Shimizu | 310/71 |
| 5,039,897 | 8/1991 | Iwamatsu et al. | 310/156 |
| 5,059,841 | 10/1991 | Frank et al. | 310/71 |
| 5,066,856 | 11/1991 | Crouse | 250/229 |
| 5,068,556 | 11/1991 | Lykes et al. | 310/90 |
| 5,182,483 | 1/1993 | Hibino et al. | 310/211 |

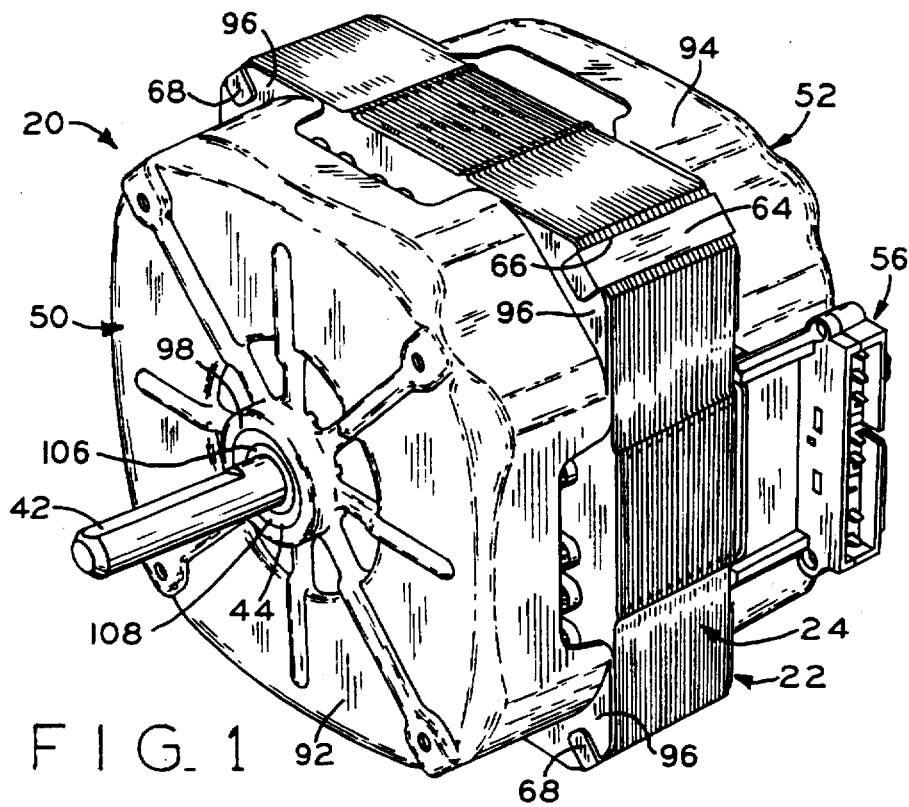
FIG_1
FIG_2

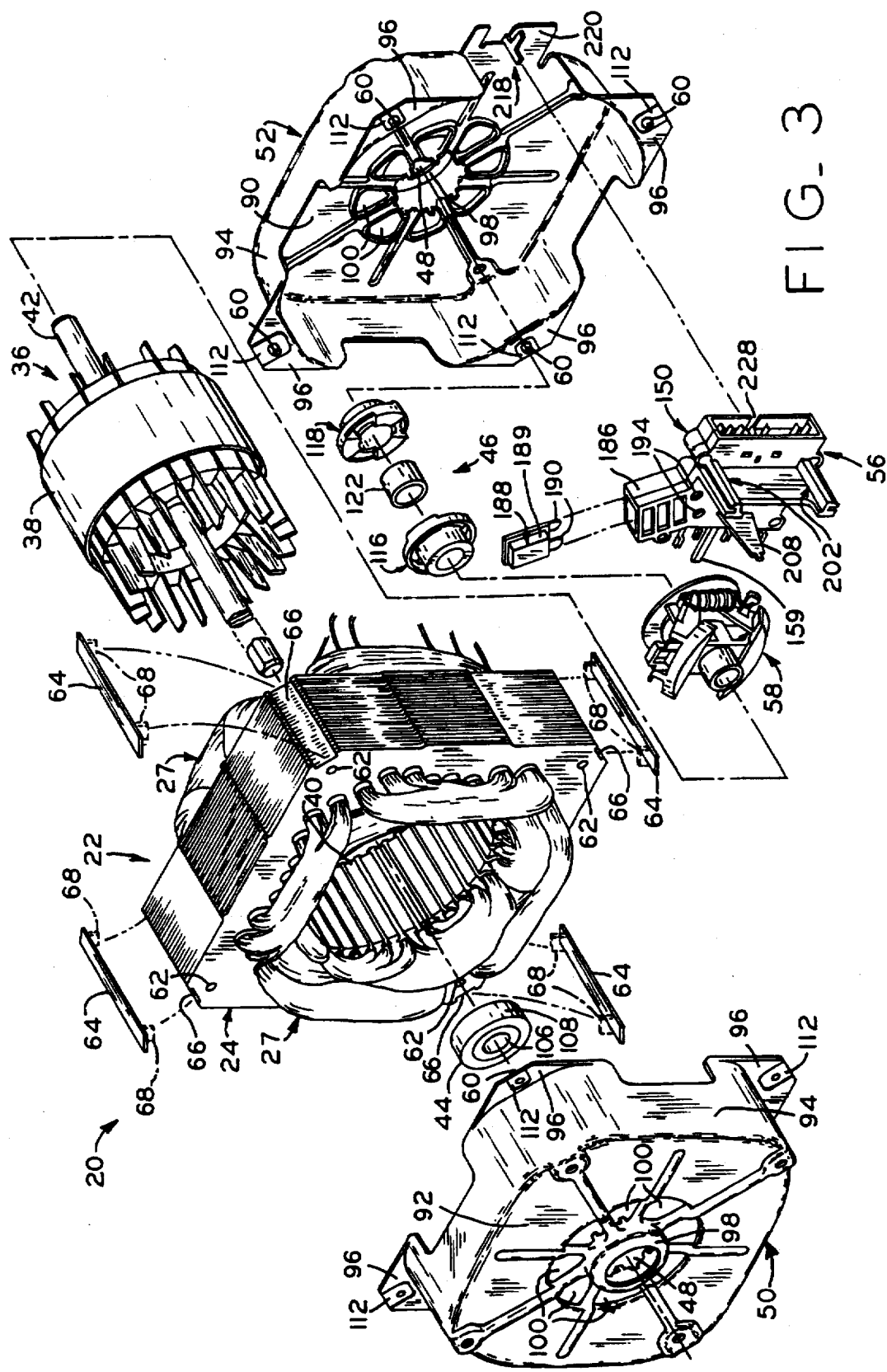
FIG_3

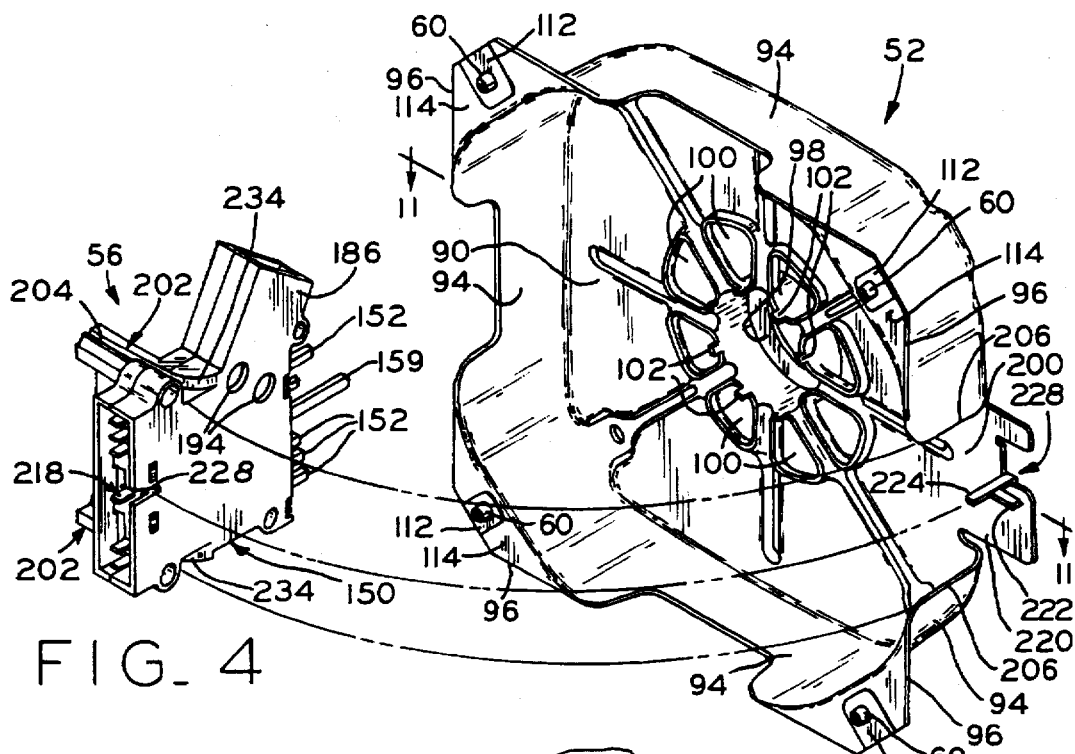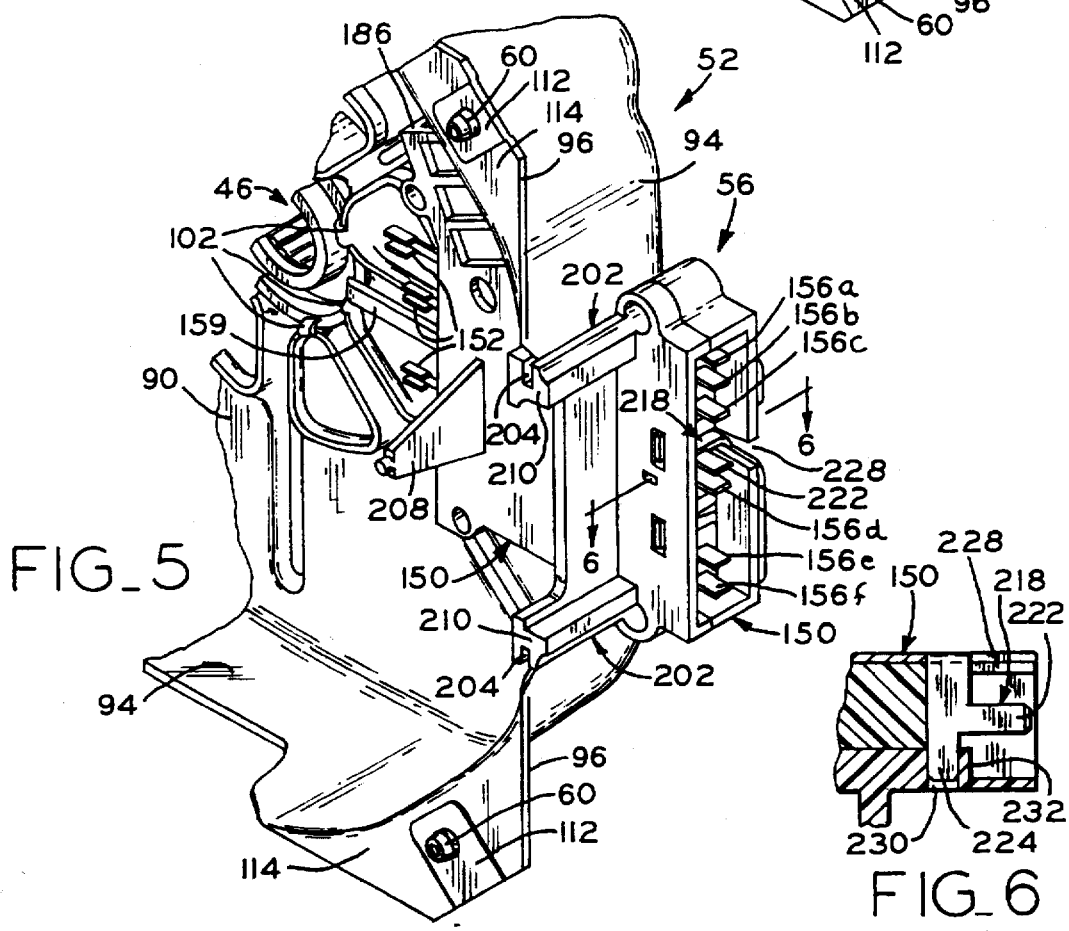

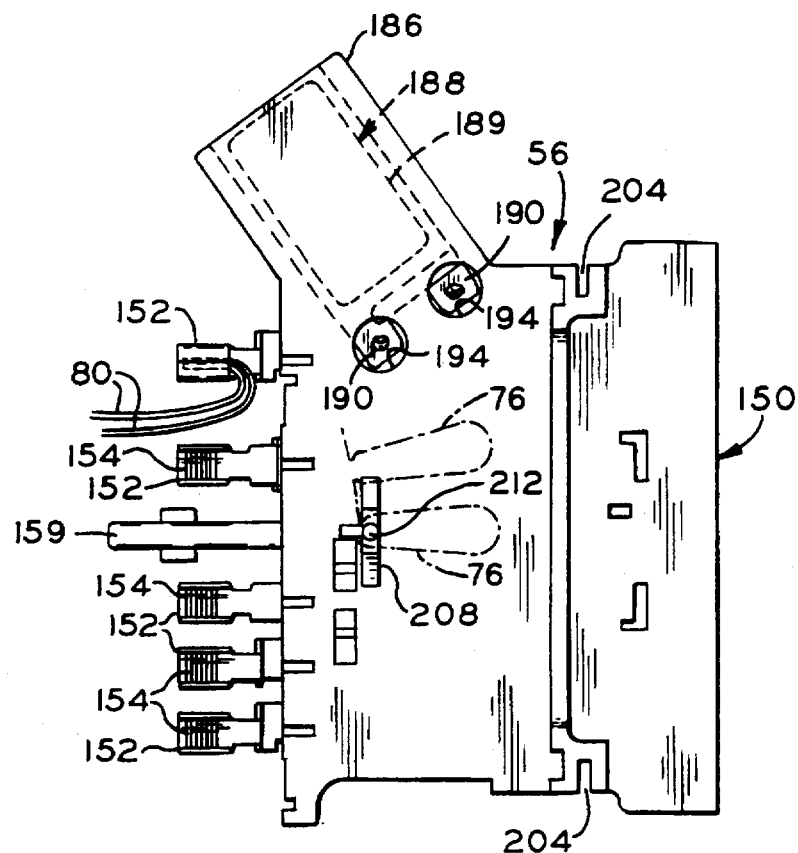
FIG_7
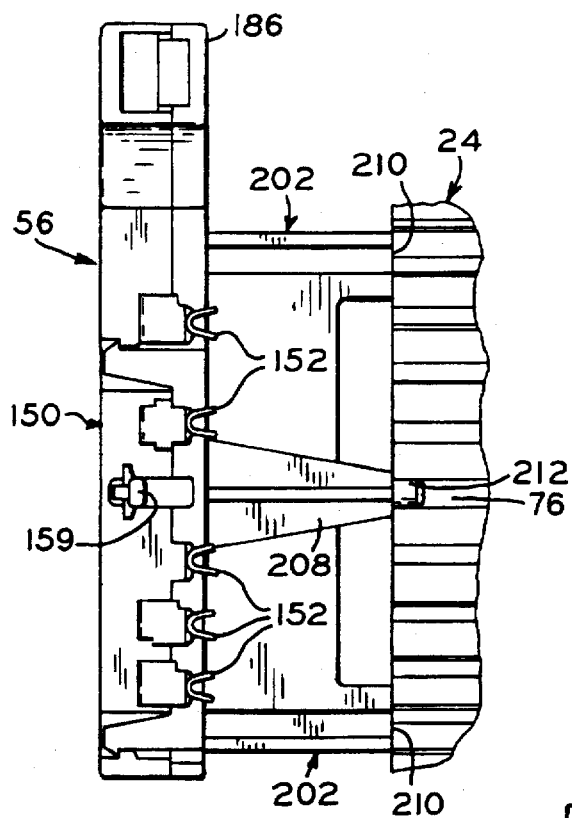
FIG_8

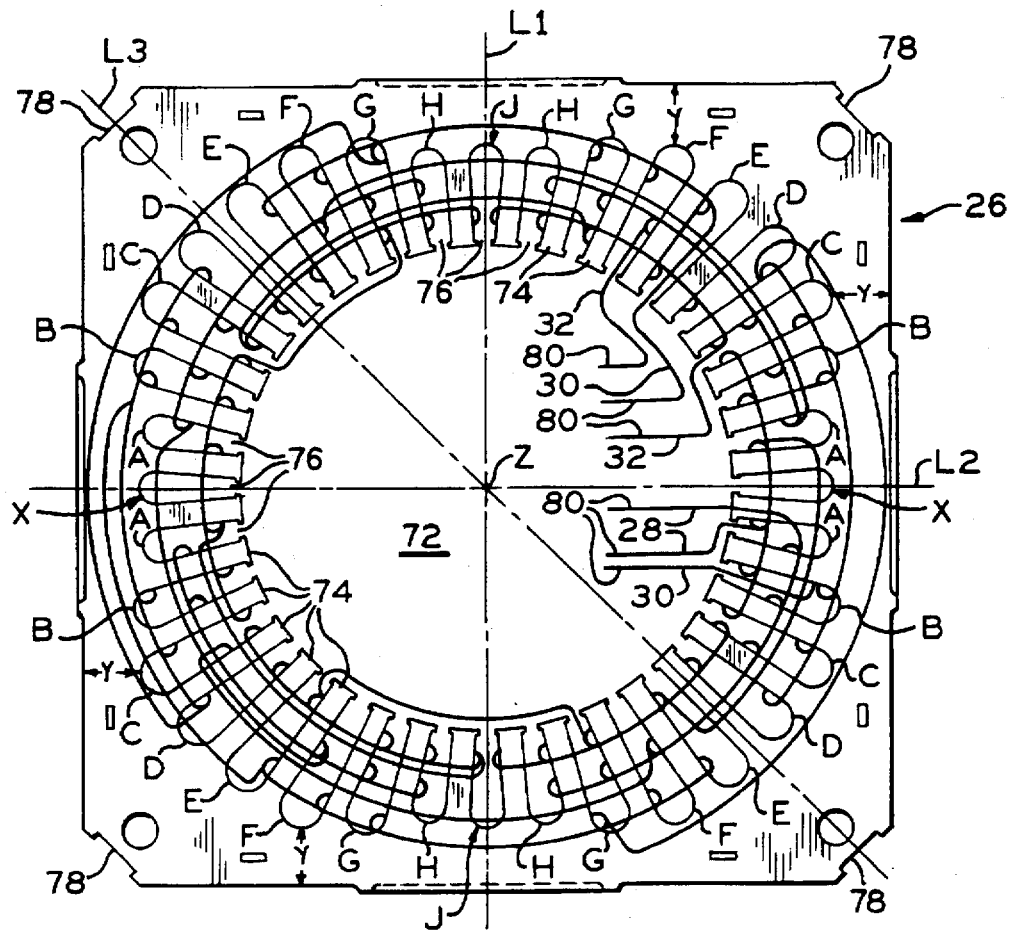
FIG_15
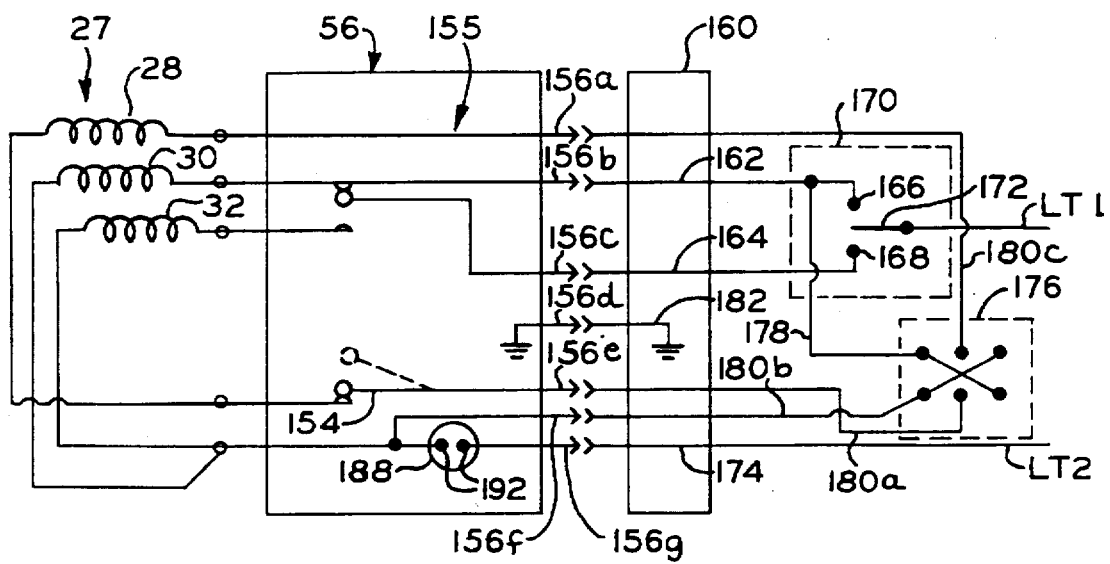
FIG_9

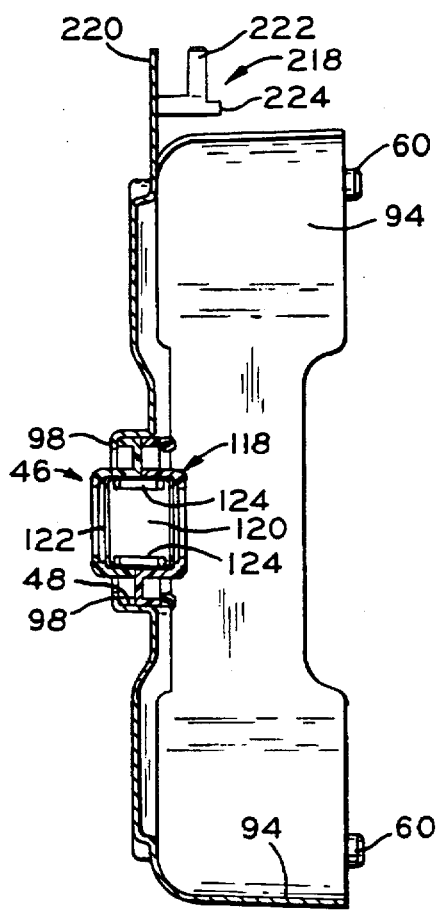
FIG_11
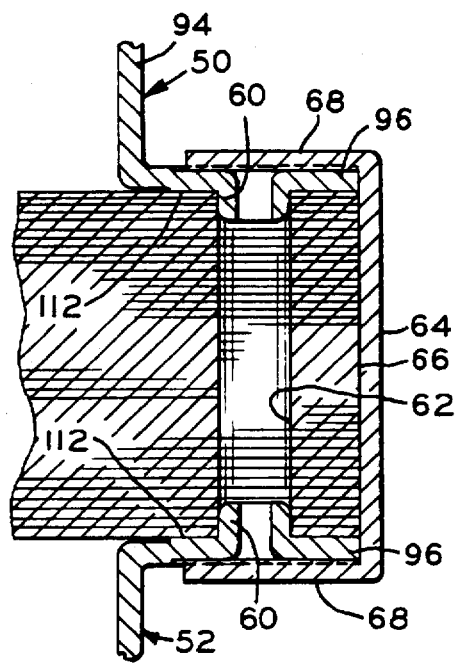
FIG_10
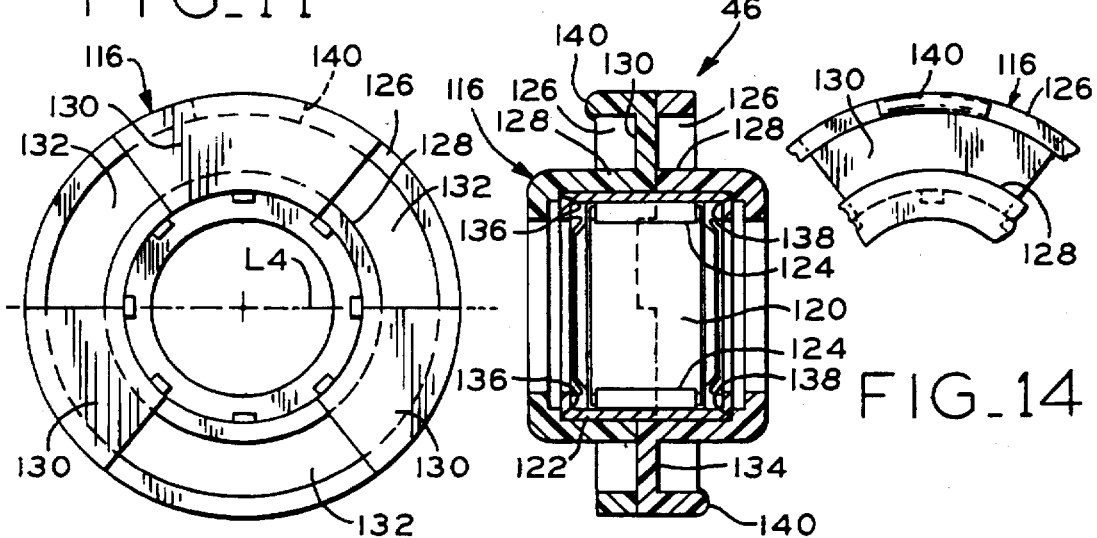
FIG_13  FIG_12
FIG_14

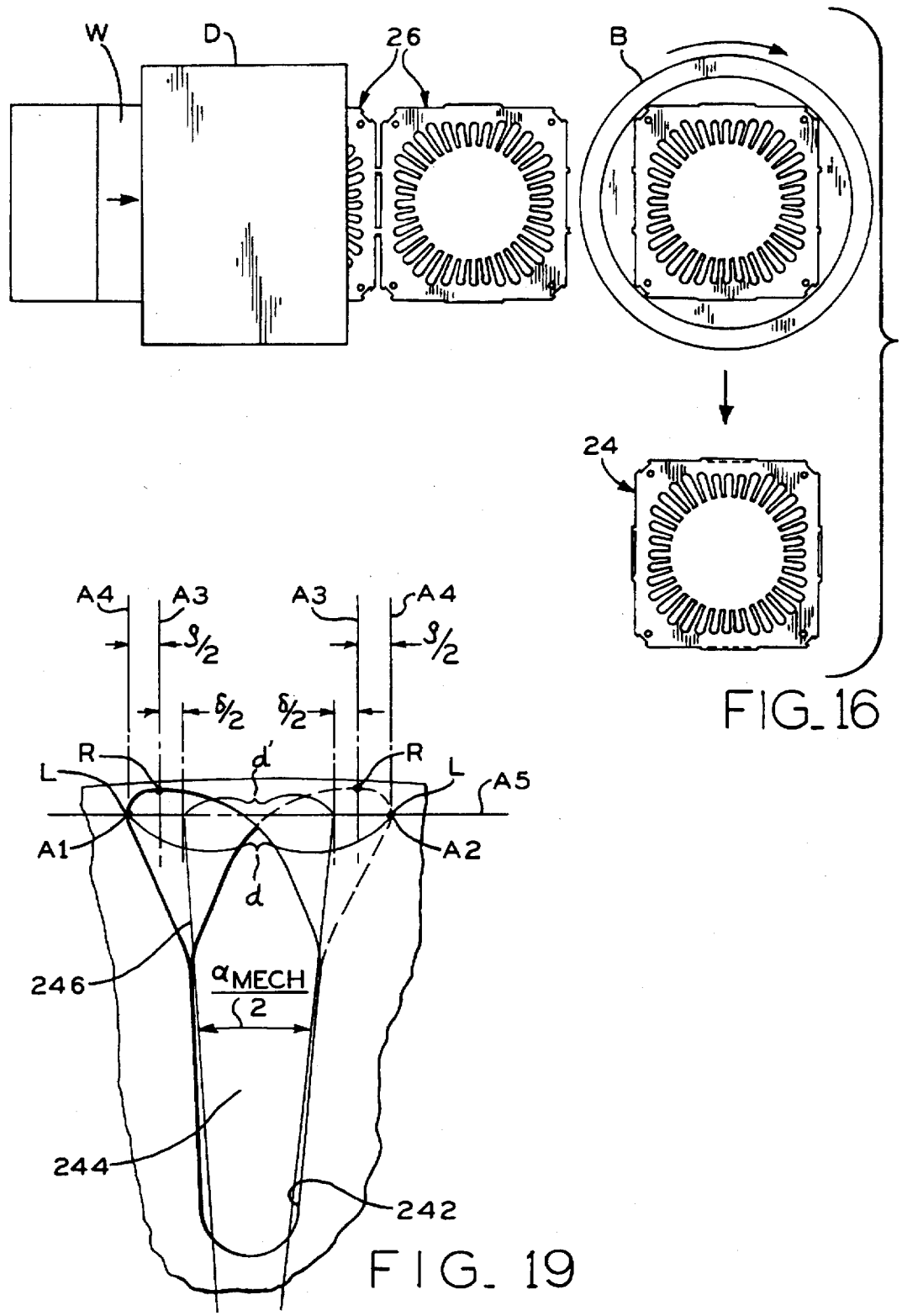

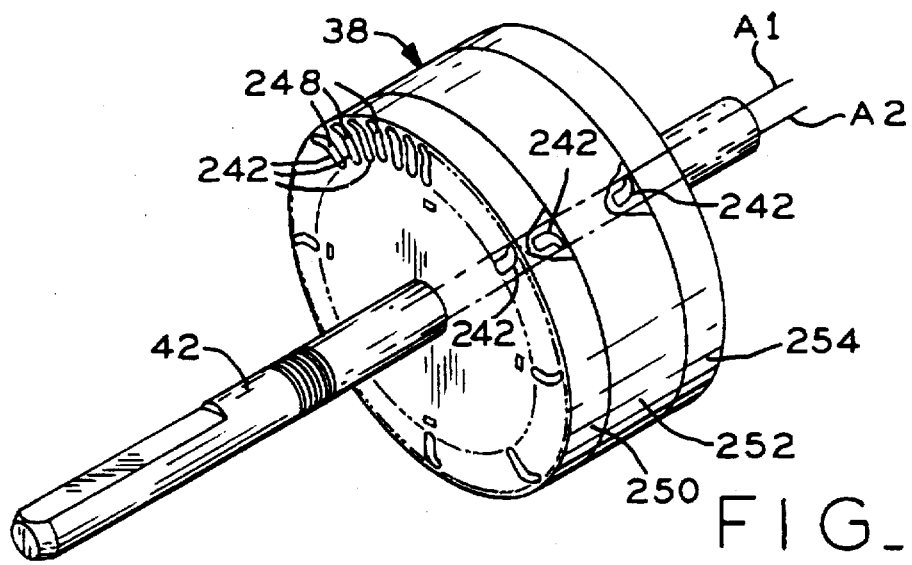
FIG_17
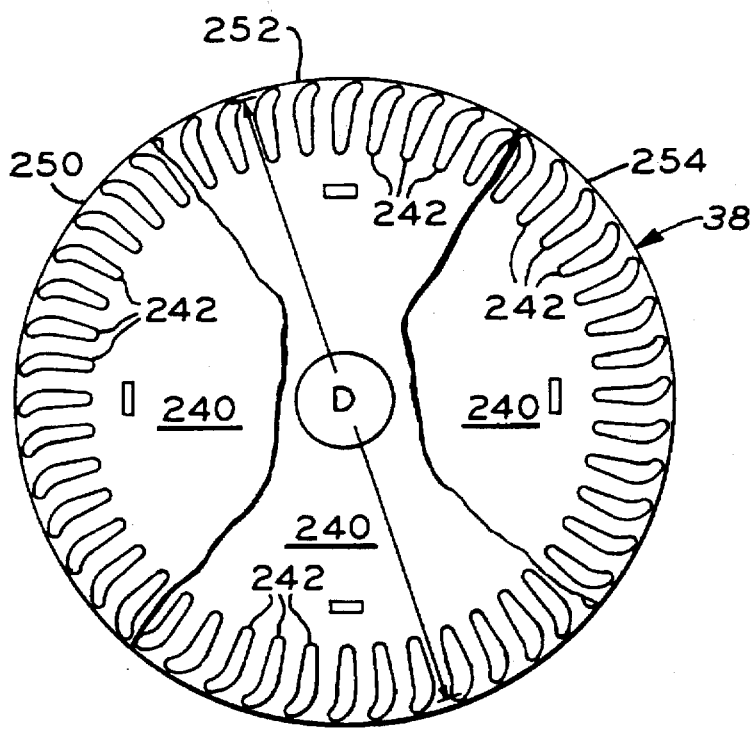
FIG_18

FIG. 21

DYNAMOELECTRIC MACHINE AND METHOD FOR MANUFACTURING SAME

This is a continuation of application Ser. No. 08/139,578, filed Oct. 20, 1993.

FIELD OF THE INVENTION

This invention relates generally to electrical apparatus and in particular to a dynamoelectric machine and a method of manufacturing the dynamoelectric machine.

BACKGROUND OF THE INVENTION

Competitive mass production of dynamoelectric machines in the form of electric motors such as those used in household appliances and other machines requires in the design and manufacture of the motor a simultaneous emphasis on speed and simplicity of manufacture, and the precision of the final motor construction. Moreover, any design or manufacturing process must not add costs out of proportion to the savings achieved through higher production. Thus, the present invention pertains to a motor which incorporates design features optimized for speed of manufacture and precision of the final product.

It is well established that the formation of the stator core of an electric motor may be most efficiently carried out by forming the core from a stack of laminations stamped from a sheet of highly magnetically permeable material. The laminations are frequently square because this shape wastes less of the sheet material from which the laminations are stamped. Each lamination is stamped with a central opening and radially extending slots which typically open into the central opening. The central openings of the stator laminations in the stack form the bore of the stator core and the slots define the teeth which extend the length of the stator bore and receive the wire windings of the motor. The slots are stamped symmetrically about the center of the central opening, leaving substantially equal amounts of material along each of the four edges of the lamination. Thus, the amount of magnetic flux which can be carried by the stator core is substantially the same along all four of its sides.

It is important that the stator bore be round and straight so that the rotor may freely rotate in the stator core bore while maintaining only a minimal separation between the rotor and the stator core. The straightness of the bore is adversely affected by the inherent presence of variations in thickness (called "gamma" variation) of the rolled sheet material from which the laminations are stamped, so that each lamination is not truly flat. If the laminations are stacked one on top of the other in the same orientation as when each lamination was stamped on the sheet material, the gamma variations will tend to add together rather than cancel out. Thus, the stator bore formed may be substantially curved and unsuitable for mating with the rotor in such a way which will permit the rotor to freely rotate in the stator bore. Punching the central openings of the laminations from the sheet material relieves certain stresses in the material, which tends to cause the material to elastically deform from the round shape struck by the punch, to an elliptical shape. Further deviations from round may be introduced by thermal stress as the stator core is annealed. Again, if the laminations are stacked together in such a way as to add the deviations from round, a bore which is too elliptical to receive the rotor may be produced. In a square lamination having substantially equal amounts of material remaining after punching on all four sides, deformations causing deviation from round can be expected to occur approximately equally along two perpendicular axes lying in the plane of the lamination. Accordingly, it is preferred to rotate each lamination 90° relative to the adjacent lamination in the stack so that gamma variations and deviations from round in the laminations tend to cancel each other out.

However, in the past 90° rotation of each lamination relative to the adjacent lamination in the stack has not been practical when constructing stator cores for certain two speed electric motors having two windings which have different numbers of poles. In a two speed motor having a four pole winding and a six pole winding, some of the turns of wire forming the poles must be placed in the same stator slots. In order to provide enough room, the slots where the windings will overlap must be deeper. This requirement introduces asymmetry in the arrangement of slots about the center of the central opening of each lamination, and reduces the amount of material on two of the sides of the lamination relative to the other sides. Equalizing the amount of material on all four sides may be accomplished by elongating the two sides having the deepest slots. However, the combination of the asymmetry of the slot arrangement and the rectangular shape of the lamination makes it impossible to rotate the laminations 90° relative to the adjacent lamination when stacking. The best that can be done presently is to rotate the laminations 180°, which does not permit cancellation of manufacturing tolerances as efficiently as 90° rotation, and thus adversely affects the roundness and straightness of the bore.

It is well known that in order to decouple stator slot order harmonics the rotor bars in the squirrel cage rotor of an induction motor should be skewed. Typically, skewing is accomplished by turning the rotor laminations making up the rotor slightly with respect to each other so that the passages formed by overlapping slots of the rotor laminations are generally helical in shape. Helical skewing can be carried out by hand using a jig, or automatically by machine. In the former instance, substantial labor costs are added to the production of the rotor, and in the latter instance it is difficult to reliably automate the delicate operation of turning the rotor laminations slightly relative to each other. Further, the helical passages have a stair-step configuration which can produce undesirable turbulence in the molten material poured into the passages to form the rotor bars. Significant savings can be realized by implementation of a "straight" skew, in which the rotor bar passage consists of two smooth, straight passages which overlap, but are skewed. The skewed passage is typically formed by making the rotor slots asymmetrical about a radial line of the rotor lamination, with the slots in one half of the stack of laminations forming the rotor being the mirror image of the slots in the other half. Although decoupling slot harmonics by using two straight passages which are skewed relative to one another is known, there is presently a need for such a straight skew which delivers better motor performance for single phase motors.

Once the rotor and stator have been constructed, it is necessary to assure that the rotor will be aligned with the stator core bore when the rotor is inserted into the bore. The rotor shaft is typically supported for free rotation at its ends in central openings in metal end frames which are connected to the stator core. Tolerances inherent in the formation of the central openings in the end frames and the stator core bore, and the absence of accurate location mechanism for the end frames on the stator core result in many rotor/stator core assemblies being out of alignment. Present practice calls for the introduction of shims in the central openings where the rotor shaft is received to bring the rotor and stator core into alignment. This procedure permits only a relatively coarse adjustment, and requires time and extra labor to accomplish.

The manufacturing step of mounting the rotor shaft on the end frames also presently requires significant labor and time to accomplish. The ends of the rotor shaft are mounted by bearings in the central openings of the end frames which permit free rotation of the rotor shaft about its longitudinal axis. Presently, the bearings include many parts and require substantial time to assemble and install in the end frames.

The inner raceways of the bearings held in the central openings of the end frames are typically fixed to the rotor shaft at predetermined locations. Thus, the relative location of the end frames is determined by the predetermined locations on the rotor shaft. The presence of tolerances in the dimensions of the rotor shaft, the end frames and the stator core occasionally results in the stator core and end frames not fitting together as they should in the assembly of the machine. A minor misalignment or structural irregularity of the rotor shaft may cause the shaft to wobble as it rotates. The wobble causes variations in the air gap (i.e., the distance separating the rotor and the stator core) which results in undesirable noise and vibration.

Another aspect of the assembly of the electric motor which is labor intensive is the electrical connection of the windings to a plug and terminal assembly used to connect the windings to a source of electricity and to control operation windings for starting the machine. Presently, there are at least four connections used to electrically connect the terminal end of each magnet wire to the plug and terminal assembly. The magnet wire is first connected to a terminal having sharp ridges which pierce the insulation on the wires to make electrical contact as the terminals are crimped against the magnet wire. The ridged terminal is connected to wire having plastic insulation, which is in turn connected to a terminal on the plug and terminal assembly. The terminal on the plug and terminal assembly is connected to the circuitry in the plug and terminal assembly. Typically, only two of these connections are made during assembly of the motor. However, each terminal connection is a more likely site for failure. Moreover, connection of the plug and terminal assembly to the end frames of the motor presently requires separate fasteners. The use of such fasteners, or alternative joining methods such as welding or soldering, adds the cost of the fasteners or joining material, and the cost of labor to connect the plug and terminal assembly by application of the fasteners or joining material.

In order to ground the motor end frames, a separate assembly step is required for ground connection. For instance, a screw may be received through an end frame and into the plug and terminal assembly, or the connection may be by insulated wire. The insulated wire is connected to the end frame by a screw or a clip, which are additional materials which require additional time to manipulate during assembly of the motor.

SUMMARY OF THE INVENTION

Among the several objects and features of the present invention may be noted the provision of a dynamoelectric machine capable of rapid production while maintaining quality at or above that of existing machines of the same type; the provision of such a machine which has fewer parts; the provision of such a machine which is secured together with fewer fasteners; the provision of such a machine which makes an economic use of materials in its construction; the provision of such a machine which has fewer internal electrical connections; the provision of such a machine which is grounded without requiring additional wiring or special ground connections; the provision of such a machine which is automatically connected to a ground remote from the machine when connected to a source of electrical power; the provision of such a machine in which the rotor and stator are accurately aligned; the provision of such a machine which accommodates misalignment or structural irregularity of the rotor without introducing substantial stresses to the machine during operation; and the provision of such a machine in which stator slot order harmonics are optimally decoupled.

Further among the objects and features of the present invention may be noted the provision of a method for manufacturing a dynamoelectric machine which requires fewer steps to secure the component parts together; the provision of such a method in which critical dimensions are held within closer tolerances to produce more accurate alignment of the stator and rotor; the provision of such a method which employs fewer individual fasteners; and the provision of such a method which can be carried out rapidly and at reasonable cost.

Generally, a two-speed dynamoelectric machine constructed according to the principles of the present invention comprises a stator, at least two windings on the stator, a rotor received in the stator and means supporting the rotor for rotation relative to the stator. A first of the two windings has a first number of poles and a second of the two windings has a second number of poles different from the first number of poles. A plurality of stator laminations stacked one on top of the other form the stator core. Each stator lamination comprises a sheet of highly magnetically permeable material having a generally central opening therein, and slots opening into the central opening and extending generally radially outwardly therefrom. The slots are disposed in an arrangement around the periphery of the central opening and receive turns of wire from the two windings of the dynamoelectric machine with at least some of the slots receiving turns of wire from both of the two windings. The arrangement of slots on each stator lamination is symmetrical about a pair of perpendicular lines lying generally in the plane of the stator lamination and intersecting generally at the center of the central opening, and about a diagonal line lying in the plane of the stator lamination, passing through the center of the central opening and making an angle of 45° with the perpendicular lines. Each stator lamination in the stack is rotated 90° relative to other stator laminations about a longitudinal axis of a central rotor-receiving bore of the stator core formed by the central openings of the stator laminations in the stack thereby forming a central bore which is straighter and more nearly cylindrical.

In another aspect of the present invention, a dynamoelectric machine comprises a stator including a stator core having a pair of opposing end faces, a bore through the stator core extending from one end face to the other end face, and windings including a start winding and at least one run winding on the stator, each winding having winding leads extending outwardly from the stator. First and second opposite end frames mounted on respective end faces of the stator core each have a generally central opening. A rotor assembly comprises a shaft received in bearing means associated with the central openings of the end frames, and a rotor fixedly mounted on the shaft for conjoint rotation therewith. The rotor is disposed at least in part in the stator core bore, and the rotor and the stator are adapted for magnetic coupling upon activation of the windings for rotating the shaft and rotor relative to the stator and end frames. A plug and terminal assembly includes a casing made of an insulator material, a plurality of lead terminals electrically connected to the winding leads and a plurality of electrical connectors protruding from the casing and electrically connected to the lead terminals. The electrical connectors are constructed for connecting the winding leads to a source of electrical power. A ground tab mounted on and in electrical contact with the second end frame is received in an opening in the casing with the ground tab being disposed for electrical connection to ground upon connection of the electrical connectors to ground.

In yet another aspect of the present invention, a dynamoelectric machine has a stator, windings, end frames, bearing means and a rotor assembly as described in the preceding paragraph. The dynamoelectric machine further comprises a plug and terminal assembly including a casing made of insulator material. A switch housed in the casing is operable between a first switch mode in which the start winding is activated and a second switch mode in which the start winding is deactivated. A plurality of electrical connectors are connected to the switch and adapted for connection to a power supply, and a plurality of magnet wire terminals are integrally connected to the switch and receive the terminal ends of the windings thereby providing direct connection of the windings to the switch.

In still another aspect of the present invention, a dynamoelectric machine comprises a stator, a rotor assembly, first and second end frames and first and second bearings. The first bearing is disposed in a central opening of the first end frame and fixedly mounted on a rotor shaft of the rotor assembly thereby to prevent axial movement of the rotor shaft relative to the first bearing. The second bearing, disposed in a central opening of the second end frame, comprises a housing and shaft bearing means supported by the housing in a shaft receiving passage. The shaft bearing means is constructed and arranged for rolling engagement with the rotor shaft in the shaft receiving passage for supporting the rotor shaft and permitting rotation of the rotor shaft about its longitudinal axis. The shaft bearing means is free of connection to the rotor shaft.

Methods of manufacturing a dynamoelectric machine are also disclosed. In one aspect of the method, end frames are each formed by simultaneously punching from sheet metal blank a generally central rotor shaft receiving opening and locator means spaced from the center of the central opening so as to precisely locate the center of the central opening relative to the locator means.

Other objects and features of the present invention will be in part apparent and in part pointed out hereinafter.

BRIEF DESCRIPTION OF THE DRAWINGS

FIG. 1 is a front perspective of an electric motor;

FIG. 2 is a longitudinal section of the motor;

FIG. 3 is an exploded front perspective of the motor;

FIG. 4 is a perspective of the rear end frame of the motor, with a plug and terminal assembly illustrated as exploded away from the end frame;

FIG. 5 is an enlarged fragmentary perspective of the rear end frame showing the plug and terminal assembly as installed on the end frame;

FIG. 6 is an enlarged fragmentary section taken in the plane including line 6—6 of FIG. 5;

FIG. 7 is a front elevation of the plug and terminal assembly showing locating posts of the assembly as received in a stator slot (shown in phantom);

FIG. 8 is an end elevation of the plug and terminal assembly and a fragmentary portion of the stator core illustrating engagement of the locating posts therewith;

FIG. 9 is a an electrical schematic of the plug and terminal assembly, shown as plugged into a power source;

FIG. 10 is an enlarged fragmentary cross section of the motor illustrating the locator nubs of the end frames and locator openings of the stator core;

FIG. 11 is a section of the rear end frame taken in the plane including line 11—11 of FIG. 4 and showing a rotor shaft bearing mounted in the central opening of the rear end frame;

FIG. 12 is a longitudinal section of the rotor shaft bearing of FIG. 11;

FIG. 13 is an end elevation of a housing piece of the housing of the rotor shaft bearing;

FIG. 14 is a fragmentary elevation of the opposite end of the housing piece of FIG. 13; and FIG. 15 is a plan of a stator lamination which forms the stator core;

FIG. 16 is a schematic illustrating the formation of stator laminations and the stator core;

FIG. 17 is a perspective of a rotor assembly of the motor, including a rotor shaft and a rotor core, with parts of the rotor core broken away to show details of construction;

FIG. 18 is a plan view of the rotor core with portions broken away to two levels to reveal the three different rotor slot orientations within the rotor core;

FIG. 19 is an enlarged fragmentary elevation of the rotor core showing a single rotor slot and illustrating in hidden lines the orientation of an underlying slot;

FIG. 21 is a diagram illustrating two preferred windings of the motor and two other windings.

Corresponding reference characters indicate corresponding parts throughout the several views of the drawings.

DETAILED DESCRIPTION OF THE PREFERRED EMBODIMENT

Figure 20:
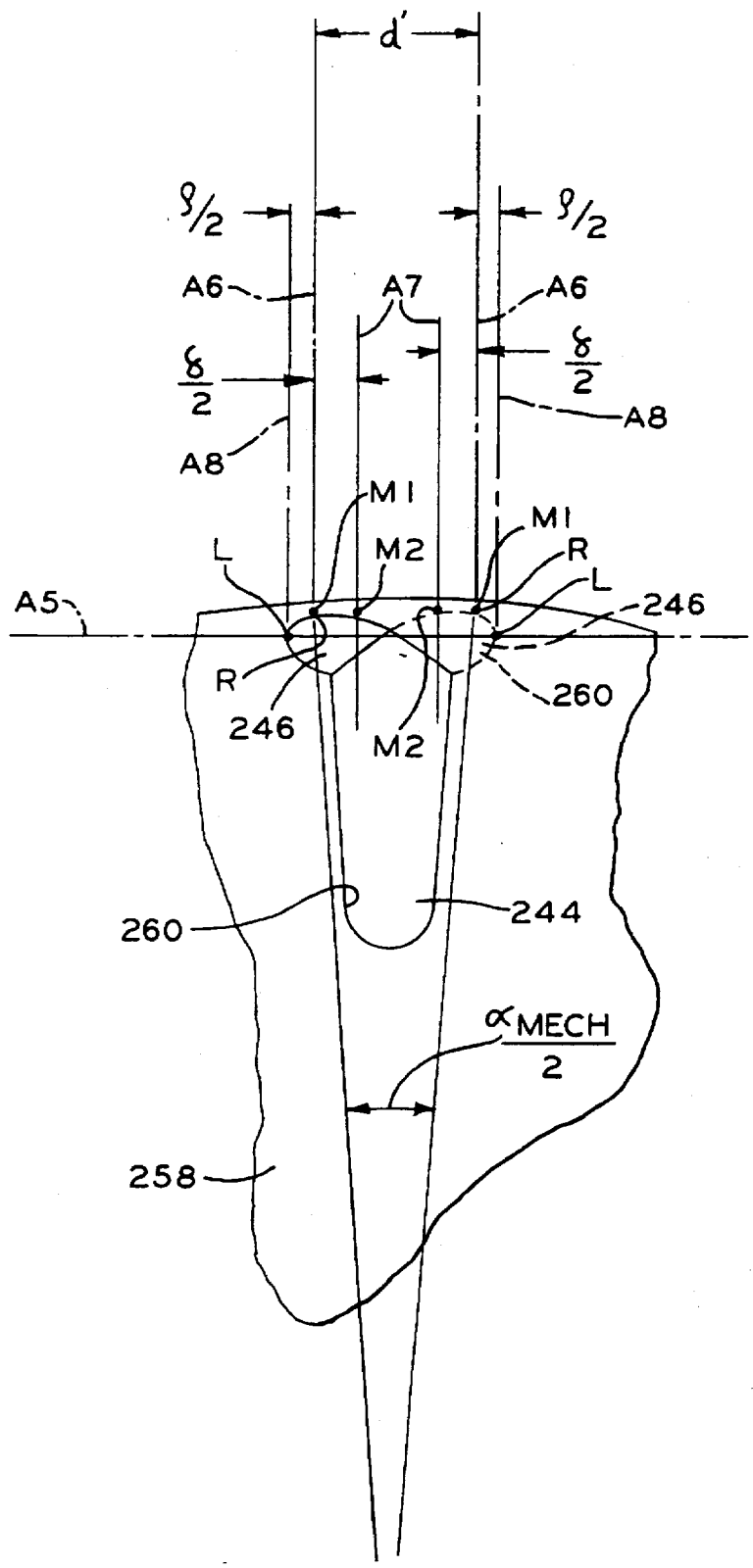
FIG. 20 is an enlarged fragmentary view of a rotor core having slots which are skewed accordingly to conventional mathematical prediction.

Referring now to the drawings, and in particular to FIGS. 1, 3 and 15, a dynamoelectric machine in the form of a single phase, two speed induction motor 20 is shown to include a stator 22 having a core 24 made up of a stack of thin stator laminations 26, and windings 27 on the stator core including a four pole start winding 28, a four pole run winding 30 and a six pole run winding 32. The stator 20, stator core 24, stator laminations 26 and windings 27 are indicated generally by their respective reference numerals. The windings illustrated are exemplary only, as the invention is applicable to dynamoelectric machines of other winding configurations. A rotor assembly indicated generally at 36 includes a rotor 38 received in a bore 40 of the stator core 24 and a rotor shaft 42 fixedly connected to the rotor. Opposite end portions of the rotor shaft 42 are received in a first bearing 44 and a second bearing (generally indicated at 46), respectively, for free rotation of the rotor assembly 36 about the longitudinal axis of the rotor shaft. As may be seen in FIG. 2, the first and second bearings 44, 46 are held in central openings 48 of first and second end frames (designated generally by reference numbers 50 and 52, respectively) which support the rotor assembly 36. A plug and terminal assembly, generally indicated at 56 is located on the second end frame 52, and a centrifugal mechanism 58 of the type well known in the art is mounted on the rotor shaft 42 adjacent the second end frame. The end frames 50, 52 engage opposite end faces of the stator core 24 where they are positively located by locator nubs 60 associated with each end frame, which locator nubs are received in corresponding locator holes 62 in the end faces. The motor 20 is held together by keys 64 which are received in preformed channels 66 in the stator core 24 and bent over at their ends 68 (shown in phantom in FIG. 3) to hold the motor components together as shown in FIG. 1.

One of the stator laminations 26 which is stacked together with a plurality of other stator laminations of identical construction to form the stator core 24 is shown in FIG. 15. The lamination 26 has a generally central opening 72, and a plurality of stator teeth 74 defining slots 76 therebetween opening into the central opening and extending generally radially outwardly from the central opening. Notches 78 at the four corners of the lamination 26 define the channel 66 of the stator core 24 (FIG. 3). As shown in FIG. 16, the laminations 26 are stamped from a strip W (from a roll R) of highly magnetically permeable material in a die D. All stator laminations 26 are preferably square in shape to permit maximum usage (and correspondingly less waste) of the material in the strip W. The slots 76 are shaped and arranged around the periphery of the central opening 72 so that the arrangement of slots is symmetrical about a pair of perpendicular lines L1 and L2 lying generally in the plane of the stator lamination 26 and intersecting generally at the center C of the central opening. The arrangement of slots 76 is also symmetrical about a diagonal line L3 lying in the plane of the stator lamination 26, passing through the center C of the central opening 72 and making an angle of 45° with the perpendicular lines L1, L2.

Stated another way, the size and arrangement of slots 76 of the stator laminations 26 are "90° symmetrical", i.e., any stator lamination superposed with another stator lamination may be rotated relative to the other stator lamination 90°, or any multiple thereof, about an axis perpendicular to the plane of the laminations and passing through the center C of the laminations, and the slots 76 will be substantially superposed and coextensive. However, it is to be understood that the rotational symmetry of the slots 76 could be other than 90° and still fall within the scope of the present invention. Generally speaking, rotational symmetry of the slots 76 of N°, where N is less than 180, will permit at least incremental improvement in the roundness and straightness of the stator bore 40.

As is known, the 90° symmetry of the stator laminations 26 permits the construction of a stator core 24 having a straighter and more nearly cylindrical bore 40. In the final assembly of the motor 20, the rotor 38 and the periphery of the stator core bore 40 should preferably have the minimum possible separation, while permitting free rotation of the rotor in the bore. Deviations of the stator core bore 40 from being straight and cylindrical typically occur because of non-uniform thickness of individual stator laminations 26 ("gamma variations"), and elliptical deformation of the central openings 72 caused by stress relief in the material after punching the central opening. It has been found that these errors tend to occur equally along the lines L1, L2 shown in FIG. 15. All of the stator laminations 26 have the same original orientation when they are stamped from the highly magnetically permeable material and fed one after another in a forward direction to a stacking station. Rotation of each stator lamination 26 from its original orientation 90° relative to the adjacent stator lamination in the stack forming the stator core 24 results in the aforementioned errors tending to cancel each other out. As shown in FIG. 16, rotation of the stator laminations 26 is carried out in a revolving barrel B (the "stacking station") into which the stator laminations are received after they are stamped. Prior to each stator lamination being driven into the barrel B, it rotates 90° so that adjacent stator laminations 26 in the stack forming the stator core 24 are rotated relative to each other 90° from their original orientations. The stacking and rotating of the stator laminations 26 continues until the stack reaches a predetermined height corresponding to the size of the stator core 24.

The four pole start winding 28, four pole run winding 30 and six pole run winding 32 are schematically illustrated on the stator lamination 26 shown in FIG. 15. Each winding 27 has a pair of magnet wire leads 80 at opposite ends of the winding which are connected to a source of power as described in detail hereinafter. It is to be understood that the precise arrangement of the windings 27 may be other than shown in FIG. 15 and still fall within the scope of the present invention. As may be seen from the winding diagram, turns of magnet wire from different windings will lie in the same slots 76.

Difficulty in exploiting the advantage derived from 90° rotation of each stator lamination 26 arises when the stator core 24 is wound for a two speed motor of the type disclosed herein having two windings each with a different number of poles (e.g., a four pole winding 30 and a six pole winding 32). More specifically, the difficulty occurs when one of the windings has a rotational symmetry which differs from and is not a whole number factor of the rotational symmetry of the stator laminations 26. Rotational symmetry of a winding is equal to the angular spacing of the poles of the winding around the periphery of the stator core bore 40. In the six pole winding 32, the poles are spaced at 60° intervals around the stator core bore 40, and no two poles of the six poles are spaced apart by 90°. If the six pole winding 32 is rotated 90° from an initial position, its appearance is not the same as it was in the initial position. Difficulty in winding a 90° symmetric stator occurs generally when two of the windings have a different number of poles, and the number of one of the poles is an even number which is greater than two and not a multiple of four.

Accordingly, when the six pole winding 32 and four pole winding 30 (or four pole start winding 28) are wound on the stator 22, some of the slots 76 adjacent two sides of the lamination will be required to receive substantially more turns of magnet wire than others. In the past, accommodation has been made by making the lamination slots which receive extra turns of wire deeper. However, this introduces asymmetry in the arrangement of slots, making them no longer 90° symmetric. Moreover, the amount of material to carry the magnetic flux produced by the windings is reduced along two of the edges of the lamination. The amount of material along each side of the lamination 26 is referred to as the "yoke" of the lamination. Preferably, the yoke should be nearly the same along all four edges of the lamination 26. The decrease in material caused by the depth of the slots can be remedied by making the lamination with an elongated rectangular shape. However, these rectangular laminations (not shown) are only symmetrical when rotated 180° relative to each Other. Less effective cancellation of gamma deviations and elliptical deformations of the central openings 72 occurs with 180° rotation of the stator laminations 26 when forming the stator core 24.

The stator lamination 26 of the present invention has been constructed to receive magnet wire from the four and six poles windings 28, 30, 32 of a two speed motor in a 90° symmetrical arrangement of the slots 76. The yoke along the four peripheral edges of the lamination 26 is substantially the same, with the minimum distance y separating the bottom of any of the slots 76 and the nearest edge of the stator lamination 26 being approximately equal along all four edges of the lamination. However, a sinusoidal distribution of the turns of magnet wire at each pole of each winding 27 would result in certain slots 76 being overfilled and other slots being under-filled. The amount a slot 76 is filled with wire is commonly expressed in terms of "slot fill percentage", which corresponds to a ratio of the cross sectional area of the magnet wire times the number of turns in the slot, divided by the area of the slot. The slot fill percentage of each slot 76 should be greater than about 30% and less than about 70%, and more preferably be greater than about 40% and less than about 60%. To achieve slot fill percentages in this range in a stator 22 made up of 90° symmetrical stator laminations 26, the spatial distribution of turns of magnet wire among the slots 76 at least some of the poles of some of the windings is distorted from an ideal sinusoidal distribution of turns for the particular number of slots of the stator. More turns of wire are placed in some slots 76 and fewer in others than would be called for in an ideal sinusoidal distribution of turns. Further, the distortion of the turns from the sinusoidal distribution is dissimilar at least two of the poles of one of the windings 27 resulting in the introduction of a controlled amount of even harmonics upon energizing the winding. Preferably, the distortion should occur in the run winding (i.e., the four pole winding 30 or six pole winding 32) which is used least in ordinary operation of the motor 20. Distortion is carried out so as to bring the slot fill percentages within the preferred ranges. Another, lesser preferred way of bringing slot fill percentages within an acceptable range is to remove turns from one or more of the poles of one of the windings 27. The precise arrangement of the turns will depend upon the size of the stator 22, the number of windings 27 and poles in each winding, as well as the desired operating characteristics of the motor 20.

Figure 21:
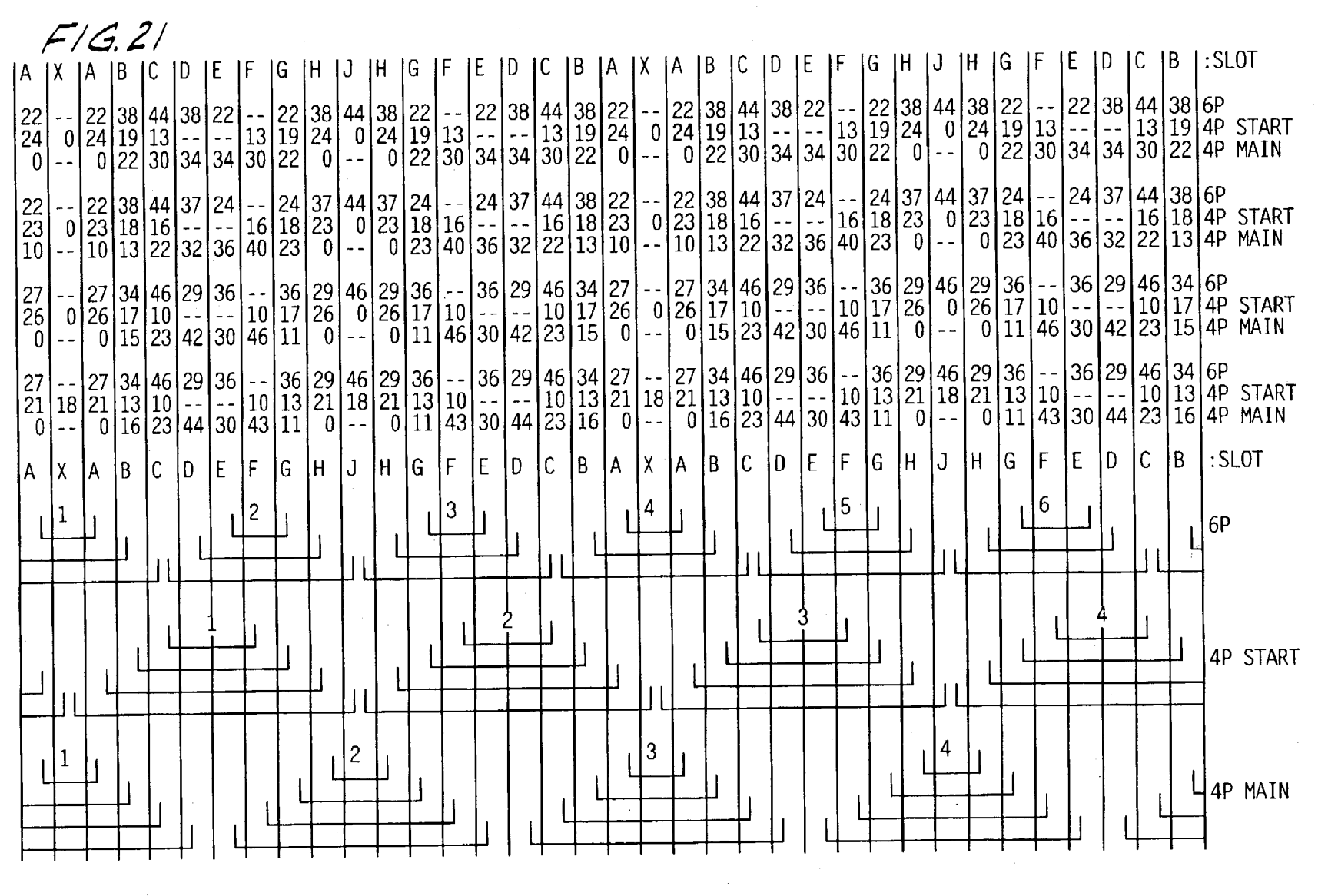

Two preferred winding configurations for the motor 20 of the present invention, having a stator 22 with 36 slots wound with a four pole start winding (designated "4P START"), four pole main winding (designated "4P MAIN") and six pole winding (designated "6P") are diagrammatically illustrated in FIG. 21, and compared with a sinusoidal winding and another winding. The lettered columns represent slots in the stator 22, as indicated on the stator lamination 26 shown in FIG. 15, and the lines between the columns represent the teeth 74 of the stator. The numbers in the columns are the number of turns received in the slot for a particular winding, and each row of numbers represents the distribution of turns for the winding designated at the right hand side of the row. The rows are arranged in four vertically spaced groups of three rows, each group representing all windings on a given stator. At the bottom of FIG. 21, the location and span of the coils of each pole for each of the windings are schematically indicated by nested brackets. The brackets illustrate generally the possible spans of the coils, but in fact the designer may chose not to include one of the spans shown by the brackets. In winding groups where it has been chosen not to include particular spans, the number "0" has been placed in the slots where turns of wire making up that span would ordinarily be received. The instance where a particular slot or slots 76 lie at the interior of the pole, and no wire is placed them, the absence of wire is indicated by dashed lines "--".

The top group of windings is a sinusoidal distribution of turns for the 36 slot stator 22 illustrated herein. A sinusoidal winding configuration is ordinarily preferred for best motor performance. However, in this instance, some of the slots are too full and others relatively empty, making it completely impractical to manufacture. The winding group second from the top in the diagram of FIG. 21 is a first attempt to reduce the disparity in the number of turns received in respective slots 76. Although this second winding configuration makes better use of the slots by distorting the turns from the sinusoidal configuration, it is also impractical to manufacture. The third and fourth groups from the top are manufacturable winding configurations and are believed to operate within acceptable parameters.

The completed stator 22 is supported together with the rotor assembly 36 in the final assembly of the motor 20 by the first and second end frames 50, 52. The rotor 38 is received inside the stator bore 40 and is in a closely spaced relation with the stator core 24 in the stator core bore. The end frames 50, 52 are each formed from sheet metal blank which is formed into a cup-shaped configuration including generally square, flat interior and exterior faces (designated 90 and 92, respectively) and a skirt 94 projecting outwardly from the interior face 90 of the end frame. Four feet 96 extend laterally outwardly from the outer edges of the skirt 94 at the corners of the end frames 50, 52. The central opening 48 of each end frame is generally tubular in shape, and an inwardly projecting retaining lip 98 narrowing the central opening at its axially outer end is disposed for engaging the bearing (44 or 46) received in the opening. Referring now to FIGS. 4 and 5, material is removed from the end frames 50, 52 at circumferentially spaced locations around their respective central openings 48 leaving vents 100 permitting circulation of cooling air through the motor. However, not all of the material at the location of the vents 100 is removed from the end frames 50, 52. At each vent 100, material is left forming a retaining tab 102 which extends axially inwardly from the inner end of the central opening 48 at the periphery of the opening.

The first bearing 44 includes an inner race 106, an outer race 108 and ball bearings 109 received in the races (FIGS. 1 and 3). The inner race 106 is fixedly connected to the rotor shaft 42 of the rotor assembly 36 adjacent one end, and the shaft and first bearing 44 are located in the central opening 48 in the first end frame 50 with the outer race of the first bearing engaging the retaining lip 98. The retaining tabs 102 are deformed inwardly against the outer ring 108 of the first bearing 44 so that the first bearing is captured in the central opening 48 between the retaining lip 98 and retaining tabs (FIG. 2). Thus, the first end frame 50 is positively located relative to the first bearing 44 and the rotor 38. The second bearing 46, described in more detail below, and the opposite end of the rotor shaft 42 are located in the central opening 48 of the second end frame 52. The second bearing 46 is captured in the central opening 48 between the retaining tabs 102 and retaining lip 98 of the second end frame 52 in the same way as the first bearing 44 (FIG. 5).

The relative radial position of the stator 22 and rotor assembly 36 is controlled by the locator nubs 60 and locator holes 62 associated with the first and second end frames 50, 52 and the stator core 24. The end frames 50, 52 each include four of the locator nubs 60, one on each of the four feet 96 of the end frame. As best seen in FIG. 10, each locator nub 60 is received in a corresponding locator hole 62 formed in the end face of the stator core 24, thereby positively radially locating the stator core and the end frames 50, 52. The nubs 60 are preferably formed by punching through the end frames 50, 52 at the feet 96 so that the nubs extend outwardly from the feet a substantial distance into the holes 60 upon assembly of the end frames with the stator 22. Positive location of the end frames 50, 52 and stator core 24 also produces positive location of the rotor assembly 36 and stator core 24 by virtue of the first and second bearings 44, 46 being captured in the central openings 48 of respective end frames. In the preferred embodiment, the locator nubs 60 and the central openings 48 of the end frames 50, 52 are punched from the sheet metal blank during the same stroke of the die, which permits a close tolerance to be maintained on the distance from the center of the central openings 48 and the center of the locator nubs 60. Likewise, the locator holes 62 in each stator lamination 26 are formed during the same stroke of the press which forms the central opening 72 of the lamination so that the distance between the center of the stator bore 40 formed by the stacked stator laminations 26 and the center of the locator holes 62 is maintained within a close tolerance. The maintenance of these close tolerances in turn allows the relative radial position of the rotor assembly 36 and stator core 24 to be maintained within a tight range for each motor 20 manufactured.

The locator nubs 60 of the end frames 50, 52 are disposed on an embossment 112 formed on each foot 96 of the end frames and protruding inwardly from an inwardly facing surface 114 of the foot (FIG. 4). As shown in FIG. 10, the embossments 112 are the portions of the feet 96 of each end frame 50, 52 which engage a respective end face of the stator core 24. All of the embossments 112 on each end frame 50, 52 are formed at the same time in the die so that their relative location is very precise, more so particularly than the relative location of the inwardly facing surfaces 114 of the feet 96. The embossments 112 on each end frame 50, 52 are generally located in a plane so that when they engage the stator core 24 the end frame is not undesirably pitched or cocked with respect to the stator core. As a direct consequence, the longitudinal axis of the rotor shaft 42 is better aligned with the centerline of the stator core bore 40.

Referring now to FIGS. 3 and 11–14, the second bearing 46 includes a plastic, tubular housing formed from first and second pieces (generally indicated at 116 and 118, respectively) and having a shaft receiving passage 120. An annular raceway defining member 122 is disposed in the shaft receiving passage 120 and extends around the shaft receiving passage. A plurality of long, thin needle bearings 124 (broadly, "shaft bearing means") are disposed in the raceway of the raceway defining member 122 and engage the rotor shaft 42 in the shaft receiving passage 120. The rotor shaft 42 is received through the shaft receiving passage 120 of the second bearing 46 and is supported for rotation by engagement with the needle bearings 124, but is free of any fixed connection to the second bearing. Thus, the shaft 42 and second bearing 46 are free to slide lengthwise of each other such that the location of the second bearing on the rotor shaft is determined by the engagement of the second end frame 52 with the stator core 24.

The first and second pieces 116, 118 of the second bearing housing are substantially identical, each having a cylindrical outer wall 126 sized for close fitting reception in the central opening 48 of the second end frame 52 and a generally cylindrical inner wall 128 which is concentric with and spaced radially inwardly of the outer wall. As shown in FIG. 13, the outer and inner walls 126, 128 are joined by three generally thin, arcuate diaphragm portions 130 extending between the inner and outer walls. The arcuate diaphragm portions 130 are spaced angularly of each other around the shaft receiving passage 120 by arcuate voids 132. The arrangement of arcuate diaphragm portions 130 and voids 132 is such that the relative location of diaphragm portions and voids is exactly reversed about a transverse line L4. Thus, when the second piece 118 is rotated about the line L4 and brought into engagement with the first piece 116, the diaphragm portions 130 of the first piece are received in the voids 132 of the second piece and vice versa. The diaphragm portions 130 of the first and second pieces 116, 118 form a continuous annular diaphragm 134 when the first and second pieces are mated together.

Preassembly of the second bearing 46 is carried out by installing the raceway defining member 122 in the first piece 116 of the housing. The raceway defining member 122 engages a locating shoulder 136 formed in the first piece 116 and projects out of the first piece. The second piece 118 slides over the exposed portion of the raceway defining member 122 and into engagement with the first piece 116. The raceway defining member engages another locating shoulder 138 in the second piece 118, and the diaphragm portions 130 of the first and second pieces mate in the way described above to form the continuous diaphragm 134. The first and second pieces 116, 118 are temporarily held on the raceway defining member 122 by friction fits, and there is preferably no separate connection of the pieces to one another. Upon installation of the second bearing 46 in the central opening 48 of the second end frame 52, and bending of the retaining tabs 102 against the second piece 118, the first and second pieces are held together by engagement with the retaining tabs and the retaining lip 98 of the central opening 48. It is to be understood that the second bearing 46 may be formed as one piece or otherwise than precisely described herein and still fall within the scope of the present invention.

The rotor shaft 42 may extend through the shaft receiving passage 120 of the second bearing 46 at an angle to the longitudinal axis L5 of the shaft receiving passage in the undeformed configuration of the second bearing housing. In that event, the diaphragm 134 deforms by deflecting out of its plane to permit the shaft receiving passage 120 to be pivoted to generally align itself with the longitudinal axis LA of the rotor shaft 42. However, the diaphragm 134 has sufficient strength of resist translational movement of the rotor shaft 42 in directions perpendicular to its longitudinal axis LA so that the shaft does not wobble as it rotates in operation. The plastic material of the second bearing housing pieces 116, 118 has a preferred modulus of elasticity in the range of 400,000 to 800,000 psi. It is believed that a modulus of elasticity of the plastic as high as 2,500,000 would still permit the second bearing 46 to function properly. Steel and other materials having far greater moduli of elasticity could be used if made sufficiently thin.

To reduce noise in operation, the clearance between the needle bearings 124 and the rotor shaft 42 is taken up by intentionally canting the second bearing 46 relative to the longitudinal axis L5 of the rotor shaft 42. Canting is accomplished by an asymmetrical formation (broadly "canting means") on the housing, which in the illustrated embodiment comprises a pair of longitudinally and radially opposite bumps 140 on the outer walls 126 of the first and second housing pieces 116, 118 (see FIGS. 12 and 14). The bump 140 associated with the first housing piece 116 engages the retaining lip 98 in the central opening 48 of the second end frame 52, causing the second bearing 46 to be tilted relative to the second end frame in the central opening. As illustrated in FIG. 2, the bump 140 is sized so that the longitudinal axis L5 of the shaft receiving passage 120 makes an angle of approximately 1° with the longitudinal axis LA of the rotor shaft 42. The angle shown in FIG. 2 has been greatly exaggerated for purposes of illustration. The intentional misalignment of the axes of the shaft receiving opening 120 and the rotor shaft 42 causes the shaft to bear against the needle bearings 124 and to elastically deform the diaphragm 134. The elasticity of the diaphragm material provides a reaction force against the rotor shaft 42 so that the needle bearings 124 are held against the shaft. This constant, forced engagement of the rotor shaft 42 and the needle bearings 124 significantly reduces noise during operation.

The bump 140 on the second housing piece 118 is not necessary to produce the desired cant of the second bearing 46 relative to the longitudinal axis of the rotor shaft 42. Of course, the bump 140 is present on the second piece 118 because it is identical to the first piece 116. To do away with the bump 140 on one of the housing pieces would require completely separate molds for the two pieces 116, 118 which is undesirable from the stand-point of cost and simplicity of assembly. However, the bump 140 on the second piece 118 also facilitates installation of the second bearing 46 in the central opening 48 of the second end frame 52 with the desired cant. More specifically, the bump on the second piece is constructed for engagement with an installing tool (not shown) having a flat face which engages the radially inner end of the second piece 118 for pushing the second bearing 46 into the central opening 48 of the second end frame 52. The bump 140 on the second piece 118 causes the second piece, and hence the entire second bearing 46 to be canted in the same direction as the engagement of the bump 140 on the first piece 116 with the retaining lip 98. Thus, the desired misalignment is achieved even when, as will occur from time to time, the bump 140 on the first piece 116 is not fully seated against the retaining lip 98 in the central opening 48.

The windings 27 may be connected to a source of electrical power via the plug and terminal assembly 56 mounted on the second end frame 52 of the motor 20. As shown in FIG. 7, the plug and terminal assembly 56 includes a two-piece casing, generally indicated at 150, made of insulator material, and a plurality of lead terminals 152 which receive the magnet wire leads 80 extending from the windings 27. The lead terminals 152 each have a serrated formation 154 including a plurality of sharpened ridges so that when the lead terminals 152 are crimped onto the magnet wire leads (as shown for the top terminal in FIG. 7), the insulation of the magnet wire is penetrated by the ridges to provide electrical connection. In the preferred embodiment, the lead terminals 152 are Amplivar® terminals manufactured by Amp, Inc. of Harrisburg, Pa. Referring to FIG. 9, a switch 157 forming part of a switch circuit (generally indicated at 155) housed in the casing 150 is operable between a first switch mode (shown in solid lines) in which the start winding 28 is activated and a second switch mode (shown in phantom) in which the start winding is deactivated. The switch 154 is operated by the centrifugal mechanism 58 in a way which is well known in the art. Generally, the centrifugal mechanism 58 rotates with the rotor shaft 42, and extends as the revolutions of the shaft reach a predetermined level to actuate a lever arm 159 which opens the switch 157. As shown in FIG. 5, a plurality of electrical connectors (designated sequentially by reference numerals 156a–156f) protruding from casing 150 are electrically connected to lead terminals 152 through the switch circuit. The electrical connectors 156a–156f are constructed as plugs for plug-in connection to a source of electrical power.

The switch circuit 155 is of conventional construction and is schematically shown in FIG. 9 as part of the electrical circuit including the windings 27, a plug 160 from the power source and control switches associated with the power source. A pair of leads 162, 164 are respectively interposed between electrical connectors 156b and 156c and a pair of terminal posts 166, 168 of a single pole double throw speed selector switch 170. Speed selector switch 170 has a movable arm 172 for selective circuit making engagement with its cooperating posts 166, 168, and the switch arm 172 is connected in circuit relation with a line terminal LT1. A switch 173 located in the circuit between the electrical connector 156a and the six pole (low speed) winding 32 is shown in its motor start position in which the four pole (high speed) winding 30 will be activated even of the arm 172 of the selector switch 170 has been moved to post 168 for low speed operation of the motor 20. The switch 173 is moved as a result of actuation of the lever arm 159 by the centrifugal mechanism 58 to de-energize the four pole winding 30 and energize the six pole winding 32 when the motor reaches the predetermined speed. Of course, when high speed (i.e., the four pole winding 30) is selected by moving the arm 172 into engagement with post 166, movement of the switch 173 out of electrical contact with the four pole winding does not result in energization of the six pole winding 32 or de-energization of the four pole winding 30.

Another line terminal LT2 is connected by a lead 174 with electrical connector 156f, the line terminals LT1, LT2 defining the power source. A double pole double throw reversing switch 176 of the type well known in the art is used for controlling the direction of current through start winding 28 and, consequently, the direction of rotation of the motor 20. A lead 178 connects the reversing switch 176 to a terminal post 166 of speed selector switch 170. Other leads, designated 180a–180c, connect the reversing switch 176 to electric connectors 156d, 156e and 156a, respectively. A ground lead 182 connects the second end frame 52 to ground, as described in more detail below.

The casing 150 of the plug and terminal assembly 56 is formed with an integral stall 186 for receiving a thermal protector indicated generally at 188 (shown exploded from the stall in FIG. 3) which protects the motor 20 from overloads. The thermal protector 188 has a housing 189 and two contacts 190 projecting from it for connection to the switch circuit 155. The thermal protector 188 may be inserted into the stall 186 with the contacts 190 extending further into the casing 150 generally in registration with contacts 192 of the switch circuit 155 (FIG. 9). As shown in FIG. 7, two openings 194 on each side of the casing 150 are located at the junction of the thermal protector contacts 190 and switch circuit contacts 192 (not seen in FIG. 7). A joining tool (not shown) is extended through the openings 194 to join (as by soldering) the thermal protector contacts 190 to the switch circuit contacts 192.

As shown in FIGS. 4 and 5, the plug and terminal assembly 56 is supported in a cutout 200 formed in the skirt 94 of the second end frame 52 without fixed connection to the end frame or other part of the motor 20. Slot defining formations, generally indicated at 202, on each side of the plug and terminal casing 150 define slots 204 which receive respective edge margins 206 of the second end frame 52 bounding the cutout 200. The slots 204 are sized so that the slot defining formations 202 grip the second end frame edge margins 206 in the slots to facilitate holding the plug and terminal assembly 56 in position. However, the slot defining formations 202 do not grip the edge margins 206 of the second end frame 52 so tightly as to prevent the plug and terminal assembly 56 from being manually slid into and out of the cutout 200. The plug and terminal assembly 56 is further secured in position in the cutout 200 by locating post means comprising in this embodiment a single generally triangular locating post 208 generally adjacent one end of the plug and terminal assembly, and a pair of flat end surfaces 210 of the slot defining formations 202 located adjacent the opposite end of the plug and terminal assembly. The locating post 208 and the flat end surfaces 210 are formed as one piece with the casing 150. As shown in FIG. 8, the locating post 208 and flat end surfaces 210 engage one end face of the stator core 24 and urge the plug and terminal assembly 56 against the second end frame 52 at the closed end of the cutout 200. A cylindrical projection 212 at the axially inner end of the locating post 208 is received in one of the slots 76 of the stator. Thus, it may be seen that the plug and terminal assembly 56 is mounted on the motor 20 without welding and without any nuts, bolts or other fastening devices.

The first and second end frames 50, 52 of the motor are grounded by connection to the ground associated with the power source (e.g., the frame of a washing machine) by a ground tab (designated generally by reference numeral 218) formed as one piece with the second end frame. As shown in FIGS. 4 and 5, the ground tab 218 is located at the bottom of the cutout 200 in the second end frame 52. The cutout 200 is formed in the sheet metal blank at a location corresponding to one side of the skirt 94 of the second end frame 52. However, the metal is not completely removed and a portion remains as a flap 220 extending laterally outwardly from the second end frame 52 at the bottom of the cutout 200. The ground tab 218 is stamped out of the material in the flap 220 and bent to project axially inwardly from the flap. An electrical connector portion 222 of the ground tab 218 projects radially outwardly of the remainder of the tab, and a stabilizing finger 224 extends axially inwardly of the electrical connector portion.

The plug and terminal assembly casing 150 is formed with an opening 228 which receives the ground tab 218 upon insertion of the plug and terminal assembly 56 into the cutout 200. As shown in FIG. 5, the electrical connector portion 222 of ground tab 218 as received in casing 150 is aligned with the other electrical connectors 156a–156f which are adapted to be connected to the plug 160 associated with the power source (FIG. 9). The stabilizing finger 224 is received in a recess 230 at the end of the opening 228 defined in part by an overhang portion 232 of the casing 150 (FIG. 6). In the recess 230, the stabilizing finger 224 is held by engagement with the overhang portion 232 and the portion of the casing 150 opposite the overhang portion from substantial movement transverse to the lengthwise extension of the finger as shown in FIG. 6. Thus, the stabilizing finger 224 aids in holding the plug and terminal assembly 56 in place in the cutout 200 in the second end frame 52 by resisting tilting movement of the plug and terminal assembly casing 150.

Referring now to FIGS. 17–19, the rotor assembly 36 of the present invention is made up of a stack of generally thin, circular rotor laminations 240 made of highly magnetically permeable material. Slots 242 in the rotor laminations 240 are spaced circumferentially around the periphery of the rotor laminations. As shown in FIG. 19, each slot 242 includes a radially inner portion 244 and a radially outer skew portion 246 extending outwardly and laterally (e.g., circumferentially), from the radially inner portion toward the circumference of the rotor lamination 240. The radially inner portion 244 of each slot 242 at least partially overlies corresponding radially inner portions of slots on the other rotor laminations in the stack forming the rotor 38. The overlying slots 242 define axially extending passages in which rotor bars 248 are disposed. The rotor bars 248 are formed by pouring molten aluminum or another suitable conductor into the passages formed by the overlying slots (FIG. 17). However, it is to be understood that rotor bars may be placed in the rotor 38 by other methods, such as press fitting, and still fall within the scope of the present invention. The rotor bars 248 are not shown in FIGS. 18 and 19 for clarity, but are connected at the ends thereof by end rings (not shown) to form a squirrel cage rotor conductor arrangement as will be understood by persons skilled in the art.

The rotor laminations 240 in the stack defining the rotor 28 are arranged in three adjacent sets, designated 250, 252 and 254, respectively. The slots 242 in the first set of laminations 250 have their skew portions 246 extending laterally in a first direction, the slots in the second set of laminations 252 have their skew portions extending laterally in a second direction opposite the first, and the slots in the third set of laminations 254 have their skew portions extending laterally in the first direction. All of the rotor laminations 240 are virtually identical. Thus, the slots 242 are of substantially the same size and shape, and thus the slots in the second set of laminations 252 (as arranged in the stack) appear to be mirror images of the slots in the first set 250 and third set 254 of laminations. As shown in FIG. 19, the radially inner portions 244 of partially overlying slots of the first set 250 and second set 252 of laminations generally overlie each other. However, the skew portions 246 of the first set 250 and second set 252 of laminations have no portions which are overlying. The skewed condition of the skew portions 246 of the slots 242 of the second set 252 of laminations relative to the skew portions of the first set 250 and third set 254 of laminations facilitates decoupling from the rotor bars 248 of stator slot order winding harmonics and stator slot opening permeance harmonics. The first set 250 and third set 254 of rotor laminations have slots 242 which are oriented the same way, and the second set of laminations 252 is interposed between the first and third sets. The dimension of each of the first set 250 and third set 254 of rotor laminations parallel to the longitudinal axis LA of the rotor shaft 42 is preferably approximately equal to ¼ the total axial dimension of the rotor, and the dimension of the second set of laminations 252 is preferably approximately equal to ½ the total axial dimension of the rotor. The arrangement of the sets 250, 252, 254 of rotor laminations produces a more balanced rotor which reduces mechanical noise in operation of the motor 20. Moreover, the arrangement of laminations 240 into the three sets 250, 252 and 254 reduces current loss due to leakage from the rotor bars into the laminations 240. It is to be understood that the rotor 38 may be formed from two sets of rotor laminations 240 having slots 242 which are skewed, or more than three sets of rotor laminations and still fall within the scope of the present invention. The skew of the present design is easily manufactured and provides particularly good performance for single phase motors.

Referring to FIGS. 17 and 19, the laterally outermost points L of the skew portions 246 of the overlying slots 242 in said first set of rotor laminations 250 lie generally along a first axially extending line A1 and the laterally outermost points of said skew portions of the corresponding slots in said second set of rotor laminations 252 lie generally along a second axially extending line A2. The skew of the slots 242 in the first and second sets may be represented by the distance d between the first line A1 and the second line A2. In the preferred embodiment, the distance d falls within a range expressed by the following equation, $$(2\pi r)/(2S-P) < d \leq (2\pi r)/(2S-P) + \delta + \rho \qquad (1)$$

The variable r is the radial distance between the center of the rotor lamination 240 and the either line A1 or A2 (FIG. 18). S is the number of slots in the stator core, and P is the number of poles of a selected one of the windings (the harmonics of which are to be decoupled from the rotor). As explained in more detail below, ρ/2 corresponds to the distance between the laterally outermost point L of the slot 242 and its radially outermost point R (FIG. 19), and δ/2 generally corresponds to the distance δ/2 between a first magnetic saturation region M1 and a second magnetic saturation region M2 (FIG. 20).

More specifically, ρ/2 is the distance between first and second parallel planes (which are seen on edge in FIG. 19 and appear as lines A3 and A4, respectively) in a third plane (which is also seen on edge in FIG. 19 and appears as line A5) which includes the lines A1 and A2. The first plane A3 includes the radially outermost point R of the skew portion 246 of the slot, and the second plane A4 includes the line A1 or A2. The first plane A3 and second plane A4 intersect the third plane A5 at right angles, and all three planes (A3, A4, A5) are perpendicular to the plane in which FIG. 19 lies.

The distance δ/2 is explained with reference to FIG. 20 showing two sets of rotor laminations 258 having slots 260 with skew portions 246 which extend laterally in opposite directions. The illustrated skewed slots 260 do not have the same shape as the slots 242 shown in FIG. 19. Generally, the rotor laminations 240 having slots 242 have more material between the slot and the circumference of the rotor lamination 240 than the rotor laminations 258 having slots 260. The configuration of the slots 260 is an initial configuration chosen on the assumption that, for each slot 260, the sole location of magnetic saturation is region M1 adjacent the radially outermost point R of each slot which corresponds to the slot bridge (i.e., the narrowest strip of material surrounding the slot). However, as explained below, we have found and unexpected result that a second saturation region M2 occurs at a location spaced from the first saturation region M1. The distance δ/2 corresponds to the distance between parallel lines, designated A6 and A7, respectively. Line A6 is perpendicular to the plane A5 and intersects the first saturation region M1 (and radially outermost point R). Line A7 is also perpendicular to plane A5 and intersects the second saturation region M2.

The stator slot order harmonics which are decoupled by the skew of the rotor bars 248 are represented by:

$$n=2mS/P+1 \quad (2)$$

where n is the harmonic order number, m is the mode number (typically m=1), S is the number of slots in the stator core 24, and P is the fundamental number of magnetic poles of the motor 20. In order to decouple a particular stator slot order harmonic, the mutual reactance X of the slot should go to zero. Mutual reactance X may be expressed by the following equation for the skew geometry of the rotor bars 248 of rotors embodying the present invention:

$$X=X_m X_\alpha, \text{ where } X_\alpha=\cos(n\alpha/4) \quad (3)$$

$X_\alpha$ is the component of mutual reactance attributable to the angle α of skew of the rotor bar in "electrical" degrees. In order to decouple a particular harmonic $X_{\alpha n}$:

$$\alpha n/4=\pi/2 \quad (4)$$

Substituting for n in equation (2), the angle of skew α needed to decouple the stator slot order harmonics can be expressed as:

$$\alpha/2=\pi(2S/P\pm1) \quad (5)$$

The conversion to mechanical degrees of skew is made by substituting $\alpha=\alpha_{mech}P/2$, or:

$$\alpha_{mech}/2=2\pi/(2S\pm P) \quad (6)$$

Thus, the predicted distance d' in plane A5 between the lines A1 and A2, defined above, may be found by substituting for $\alpha_{mech}$ in equation (6):

$$\alpha_{mech}=2\pi d'/(2\pi r) \quad (7)$$

or, after simplification:

$$d'=(2\pi r)/(2S\pm P) \quad (8)$$

It is apparent from equation (7) that distance d' is the length of an arcuate segment of a circle having a radius r. The arcuate segment corresponding to d' would be defined by the intersection of radial lines (not shown) passing through the laterally outermost points L of the skew portions 246 with the circle of radius r. However, the difference between the linear distance between end points of the arcuate segment of length d' and the length d' is so small that it has been represented as a linear distance in the drawings. Likewise, the distances δ and ρ, which are actually lengths of arcuate segments of a circle having a radius r, are shown for simplicity as linear distances in a plane A5. The distances δ/2 and ρ/2 are large relative to the difference between the arcuate distance and the linear distance between end points of the corresponding arcuate segments. The arcuate segment of length δ/2 would be defined by the intersection of radial lines (not shown) passing through the first and second saturation regions M1 and M2, respectively, with the circle of radius r. The arcuate segment of length ρ/2 would be defined by the intersection of radial lines (not shown) passing through the radially outermost point R and laterally outermost point L of a slot 242 with the circle of radius r.

The predicted distance d' (which is actually a range due to the presence of ±P) does not in fact equate to the distance d between laterally outermost points of the skew portions 246 of the slots 242 of the rotor laminations of the first set 250 and second set 252. The predicted distance d' must be first corrected by adding ρ/2 for both the slots of the first set 250 of rotor laminations and the slots of the second set 252 of rotor laminations to account for the distance (ρ/2) in the plane line A5 between the radially outermost point R and the laterally outermost point L intersecting line A1 of the first set slot, and the distance (ρ/2) in the plane A5 between the radially outermost point R and the laterally outermost point L intersecting line A2 of the second set slot. Ideally, ρ would equal zero and the radially outermost point R would coincide with the laterally outermost point L. However, the slot 242 should preferably have a finite radius of curvature at the radially outermost point R to accommodate manufacture so the two points L and R do not actually coincide.

However, even when the distance d' has been modified to account for the noncoincidence of the radially outermost point R and the laterally outermost point L, the optimum skewing for single phase motors has not been achieved. The equations (3)–(8), used to predict the necessary skew distance d', clearly assume that the location of magnetic flux saturation (M1) will be in the narrowest strip of rotor lamination material between the slot 260 and the outer circumference of the lamination 258 (i.e., generally at the radially outermost point R of the slot). Referring to FIG. 20, the predicted distance between laterally outermost points L Of the slots 260 having oppositely extending skew portions is d'+ρ. In FIG. 20, ρ/2 is the distance between a first plane (seen on edge in FIG. 20 and represented by line A6) and a second plane (also seen on edge in FIG. 20 and represented by line A8). The first plane A6 intersects the radially outermost point R and is perpendicular to a third plane seen on edge in FIG. 20 and represented by line A5. The second plane A9 is parallel to the first plane A6 and intersects a line including the laterally outermost points L of the axially aligned slots of a respective set of rotor laminations 258.

However, we have surprisingly found that for single phase motors there is a second saturation region M2 spaced from the first region M1, as discussed above (FIG. 20). In order to compensate for this unexpected anomaly, the skew distance d is further increased from the predicted distance d' +ρ by δ, where δ/2 corresponds to the distance between the narrow strip (i.e., first magnetic saturation region M1) and the second saturation region M2, as stated above. The skew distance d will always be greater than the predicted distance d'. Accordingly, the lower limit for the skew distance d will be greater than the upper predicted distance d' (i.e., d>πD/(2S-P)+ρ). The amount δ varies from slot-to-slot and with the rotational position of the rotor 38 relative to the stator 22. Therefore, δ is actually an averaged value of the actual δ associated with each slot 242. Presently, we have determined δ both experimentally, and by use of a finite element analysis of the rotor 38. In view of the foregoing, d would preferably be chosen as:

$$d=\pi D/2S+\rho+\delta \tag{9}$$

where the quantity ρ+δ is sufficiently large so that the distance d still exceeds the predicted distance d', or:

$$\rho+\delta>\pi D/(2S-P)-\pi D/(2S) \tag{10}$$

The dynamoelectric machine (induction motor 20) of the present invention is constructed for ease, speed and precision of assembly. The component parts of the motor shown in FIG. 3 may be assembled without the used of fasteners other than the keys 64. Nut and bolt fasteners may be completely eliminated. As discussed above, many of the component parts, in particular the stator 22 and the end frames 50, 52, have been constructed to achieve greater precision and to facilitate the final assembly of the motor 20. The following is an example of one way in which the motor components shown in FIG. 3 might be assembled together. However, this example is not exclusive of other possible methods of assembly, particularly in the order of assembly.

The first bearing 44 is press fit onto the rotor shaft 42 of the rotor assembly 36 at a predetermined location. The centrifugal mechanism 58 is fixed to the rotor shaft 42 on the opposite side of the rotor 38 from the first bearing 44. The end of the rotor shaft 42 mounting the first bearing 44 is inserted into the central opening 48 of the first end frame 50 with the first bearing engaging the retaining lip 98 of the central opening to terminate further movement of the rotor shaft and first bearing through the opening. The retaining tabs 102 are bent over against the first bearing 44 to capture the first bearing in the central opening 48 of the first end frame 50.

The stator 22 is placed over the rotor assembly 36 with the rotor 38 being received in the stator core bore 40. One end face of the stator core 24 engages the embossments 112 on the feet 96 of the first end frame 50, and the locator hubs 60 are received in corresponding locator holes 62 of the stator core 24. The stator windings 27 are connected to the plug and terminal assembly 56 by placing the magnet wire leads 80 into respective lead terminals 152 and crimping the terminals against the magnet wire (FIG. 7). The ridges of the serrated formation 154 of the lead terminals 152 penetrate the magnet wire insulation and bring the lead terminals into electrical connection with the magnet wires.

The second bearing 46, assembled as previously described, is secured in the central opening 48 of the second end frame 52 by bending over the retaining tabs 102 against the bearing. The second end frame 52 is placed over the end of the rotor shaft 42 opposite the first end frame 50 and the rotor shaft is received in the shaft receiving passage 120 of the second bearing 46. The plug and terminal assembly 56 is mounted on the second end frame 52 by pushing it into the cutout 200. The slots 204 of the slot defining formations 202 have flared mouths 234 at one end to facilitate entry of the edge margins 206 bordering the cutout 200 into the slots (FIGS. 4 and 5). The ground tab 218 is received into the opening 228 in the casing 150 as the plug and terminal assembly 56 is pushed into the cutout 200, and the stabilizing finger 224 enters the recess 230. The electrical connector portion 222 of the ground tab 218 is aligned with the electrical connectors 156a–156f of the plug and terminal assembly 56 so that it is prepared to be plugged into the ground lead 182 when the motor 20 is connected to a source of electrical power.

The second end frame 52 is pushed toward the end face of the stator core 24 with the rotor shaft 42 sliding through the shaft receiving passage 120 until the embossments 112 on the feet 96 of the second end frame 52 engage the end face of the stator core with the locator nubs 60 received in the locator holes 62 in the stator core. The motor components are secured together by placing the keys 64 into the channels 66 in the stator core 24 and deforming the ends 68 of the keys over onto the feet 96 of respective end frames 50, 52. The intentional misalignment of the axis L5 of the shaft receiving passage 120 of the second bearing 46 with the longitudinal axis LA of the rotor shaft 42 causes the diaphragm 134 of the second bearing to be elastically deformed and hold the needle bearings 124 against the rotor shaft.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A stator for a two-speed dynamoelectric machine, the stator comprising a first winding having a first number of poles and a second winding having a second number of poles different from the first number of poles, said second number being an even number which is greater than two and not also a multiple of four, and a stator core comprising a plurality of stator laminations stacked one on top of the other, each stator lamination having an initial orientation as formed which is the same as the other stator laminations, each stator lamination comprising a sheet of highly magnetically permeable material having a generally circular central opening therein, and slots opening into the central opening and extending generally radially outwardly therefrom, the slots being disposed in an arrangement around the periphery of the central opening and receiving turns of wire from said two windings of the dynamoelectric machine with at least some of the slots receiving turns of wire from both of said two windings, said arrangement of slots on each stator lamination being symmetrical about a pair of perpendicular lines lying generally in the plane of the stator lamination and intersecting generally at the center of the central opening and about a diagonal line lying in the plane of the stator lamination, passing through the center of the central opening and making an angle of 45° with said perpendicular lines, each stator lamination in the stack being rotated 90° relative to the initial orientations of adjacent stator laminations in the stack about a longitudinal axis of a central rotor-receiving bore of the stator core formed by the central openings of the stator laminations in the stack thereby forming a more precisely cylindrical and straighter central bore.

2. A stator core as set forth in claim 1 wherein each stator lamination is a generally square sheet of magnetic material having four peripheral edges.

3. A stator core as set forth in claim 2 wherein a minimum distance separating a bottom of any of the slots and the nearest peripheral edge of the stator lamination is approximately equal for all four peripheral edges of the lamination.

4. A stator for a two-speed dynamoelectric machine, the stator comprising a stator core including a plurality of stator laminations stacked one on top of the other, each stator lamination having an initial orientation as formed which is the same as the other stator laminations, each stator lamination comprising a sheet of highly magnetically permeable material having a generally central opening therein, and slots disposed around the periphery of the central opening, the slots opening into the central opening and extending generally radially outwardly therefrom, each stator lamination in the stack being rotated N° relative to the initial orientations of adjacent stator laminations in the stack about an axis perpendicular to the stator lamination and passing through the center of its said central opening, the slots being so sized and arranged that the slots of each stator lamination are superposed and substantially coextensive with the slots of said immediately adjacent stator laminations, and at least two windings on the stator core, turns of wire forming the two windings being received in the slots with at least some of the slots receiving turns of wire from both of the two windings, the two windings having magnetic poles disposed generally around the central opening of the stator core, the number of poles in each of the two windings being different, none of the poles of at least one of the windings being separated around the central opening by N° or any whole number factor thereof.

5. A stator as set forth in claim 4 wherein each stator lamination is a generally square sheet of highly magnetically permeable material having four peripheral edges.

6. A stator as set forth in claim 5 wherein a minimum distance separating a bottom of any of the slots and the nearest peripheral edge of the stator lamination is approximately equal for all four peripheral edges of the lamination.

7. A two-speed dynamoelectric machine comprising a stator, at least two windings on the stator, a rotor received in the stator and means supporting the rotor for rotation relative to the stator, a first of the two windings having a first number of poles and a second of the two windings having a second number of poles different from the first number of poles, said second number being an even number which is greater than two and not also a multiple of four, the stator comprising a plurality of stator laminations stacked one on top of the other, each stator lamination having an initial orientation as formed which is the same as the other stator laminations, each stator lamination comprising a sheet of highly magnetically permeable material having a generally central opening therein, and slots opening into the central opening and extending generally radially outwardly therefrom, the slots being disposed in an arrangement around the periphery of the central opening and receiving turns of wire from said two windings of the dynamoelectric machine with at least some of the slots receiving turns of wire from both of said two windings, said arrangement of slots on each stator lamination being symmetrical about a pair of perpendicular lines lying generally in the plane of the stator lamination and intersecting generally at the center of the central opening and about a diagonal line lying in the plane of the stator lamination, passing through the center of the central opening and making an angle of 45° with said perpendicular lines, each stator lamination in the stack being rotated 90° relative to the initial orientations of adjacent stator laminations in the stack about a longitudinal axis of a central rotor-receiving bore of the stator core formed by the central openings of the stator laminations in the stack thereby forming a more precisely cylindrical and straighter central bore.

8. A dynamoelectric machine as set forth in claim 7 wherein each stator lamination is a generally square sheet of highly magnetically permeable material having four peripheral edges.

9. A dynamoelectric machine as set forth in claim 8 wherein a minimum distance separating a bottom of any of the slots and the nearest peripheral edge of the stator lamination is approximately equal for all four peripheral edges of the lamination.

10. A dynamoelectric machine as set forth in claim 7 wherein each pole is defined by a plurality of generally concentric coils formed by the turns of wire of the winding, the spatial distribution of the turns of wire among the coils at least one of the poles being dissimilar from the spatial distribution of the turns among the coils of at least one of the remaining poles of the winding.

11. A dynamoelectric machine having at least two speeds, the dynamoelectric machine comprising a stator core, at least two run windings on the stator core, a rotor received in the stator and means supporting the rotor for rotation relative to the stator, a first of the two windings having a first number of poles and a second of the two windings having a second number of poles different from the first number of poles, said second number being an even number which is greater than two and not also a multiple of four, the stator core comprising a plurality of stator laminations stacked one on top of the other, each stator lamination comprising a generally square sheet of highly magnetically permeable material having a generally central opening therein, and slots opening into the central opening and extending generally radially outwardly therefrom toward respective edges of the stator lamination, the slots being disposed in an arrangement around the periphery of the central opening and receiving turns of wire therein from said two windings of the dynamoelectric machine with at least some of the slots receiving turns of wire from both of said two windings, each stator lamination having a substantially equal yoke along all four edges thereof.

12. A dynamoelectric machine as set forth in claim 11 wherein the slot fill percentage of the slots is greater than about 30% and less than about 70%.

13. A dynamoelectric machine as set forth in claim 12 wherein the slot fill percentage of the slots is greater than about 40% and less than about 60%.

14. A dynamoelectric machine as set forth in claim 13 wherein each pole of said second winding is defined by a plurality of generally concentric coils formed by the turns of the winding, the spatial distribution of the turns of wire of at least one of the poles of said second winding is dissimilar from the spatial distribution of the turns of at least one of the remaining poles to accommodate said first and second windings in the arrangement of slots of the stator.

15. A dynamoelectric machine as set forth in claim 14 wherein at least two but less than all of the poles of said second winding are defined by a first predetermined number of turns of wire and the remainder of the poles of the second winding being defined by a second predetermined number of turns of wire different than the first predetermined number of turns of wire.

16. A dynamoelectric machine as set forth in claim 13 wherein each pole of said second winding is defined by a plurality of generally concentric coils formed by the turns of the winding, the distribution of turns among the coils at each pole is distorted from an ideal distribution corresponding to the most nearly sinusoidal distribution of the turns for the arrangement of slots in the stator to accommodate said first and second windings in the arrangement of slots of the stator, the distortion of the distribution of the turns being dissimilar in at least two of the poles of said second winding.

17. A dynamoelectric machine as set forth in claim 11 wherein said arrangement of slots on each stator lamination is symmetrical about a pair of perpendicular lines lying generally in the plane of the stator lamination and intersecting generally at the center of the central opening and about a diagonal line lying in the plane of the stator lamination, passing through the center of the central opening and making an angle of 45° with said perpendicular lines, each stator lamination having an initial orientation as formed which is the same as the other stator laminations, each stator lamination in the stack being rotated 90° relative to the initial orientations of adjacent stator laminations in the stack about a longitudinal axis of a central rotor-receiving bore of the stator core formed by the central openings of the stator laminations in the stack thereby forming a more precisely cylindrical and straighter central bore.

18. A dynamoelectric machine having at least two run speeds, the dynamoelectric machine comprising a stator core, at least two windings on the stator core having a plurality of poles, a first of the two windings having a first number of poles and a second of the two windings having a second number of poles different from the first number of poles, a rotor received in the stator and means supporting the rotor for rotation relative to the stator, the stator core comprising a plurality of stator laminations stacked one on top of the other, each stator lamination comprising a generally square sheet of highly magnetically permeable material having a generally central opening therein, and slots opening into the central opening and extending generally radially outwardly therefrom toward respective edges of the stator lamination, the slots being disposed in an arrangement around the periphery of the central opening and receiving turns of wire therein from said two windings of the dynamoelectric machine with at least some of the slots receiving turns of wire from both of said two windings, each pole being defined by a plurality of generally concentric coils formed by turns of wire of the winding, the distribution of turns among the coils defining at least one of the poles of the second winding being distorted from an ideal distribution corresponding to a most nearly sinusoidal distribution of the turns for the arrangement of slots in the stator to accommodate said first and second windings in the arrangement of slots of the stator, the distribution of turns at said one pole of the second winding being different than the distribution at at least one of the other poles of the second winding.

19. A dynamoelectric machine as set forth in claim 18 wherein the slot fill percentage of the slots is greater than about 30% and less than about 70%.

20. A dynamoelectric machine as set forth in claim 18 wherein the slot fill percentage of the slots is greater than about 40% and less than about 60%.

21. A dynamoelectric machine as set forth in claim 18 wherein two of the poles of said second winding are defined by a first predetermined number of turns of wire and the remainder of the poles of the second winding being defined by a second predetermined number of turns of wire greater than the first predetermined number of turns of wire.

22. A dynamoelectric machine as set forth in claim 18 wherein said arrangement of slots on each stator lamination is symmetrical about a pair of perpendicular lines lying generally in the plane of the stator lamination and intersecting generally at the center of the central opening and about a diagonal line lying in the plane of the stator lamination, passing through the center of the central opening and making an angle of 45° with said perpendicular lines, each stator lamination in the stack being rotated 90° relative to the adjacent stator laminations in the stack about a longitudinal axis of a central rotor-receiving bore of the stator core formed by the central openings of the stator laminations in the stack thereby forming a more precisely cylindrical and straighter central bore.

23. A dynamoelectric machine as set forth in claim 18 wherein the distribution of turns among the coils defining at least one of the poles of the first winding is distorted from an ideal distribution corresponding to the most nearly sinusoidal distribution of the turns for the arrangement of slots in the stator to accommodate said first and second windings in the arrangement of slots of the stator.

* * * * *